(12) United States Patent
Matsui et al.

(10) Patent No.: US 8,659,839 B2
(45) Date of Patent: Feb. 25, 2014

(54) IMAGING LENS AND IMAGING DEVICE

(75) Inventors: Kazuki Matsui, Hachioji (JP); Yasunari Fukuta, Osaka (JP)

(73) Assignee: Konica Minolta Advanced Layers, Inc., Tokyo (JP)

( * ) Notice: Subject to any disclaimer, the term of this patent is extended or adjusted under 35 U.S.C. 154(b) by 0 days.

(21) Appl. No.: 13/580,943

(22) PCT Filed: Feb. 17, 2011

(86) PCT No.: PCT/JP2011/053349
§ 371 (c)(1),
(2), (4) Date: Aug. 23, 2012

(87) PCT Pub. No.: WO2011/105274
PCT Pub. Date: Sep. 1, 2011

(65) Prior Publication Data
US 2012/0320261 A1 Dec. 20, 2012

(30) Foreign Application Priority Data

Feb. 26, 2010 (JP) .................. 2010-041885
Feb. 26, 2010 (JP) .................. 2010-041886
Apr. 22, 2010 (JP) .................. 2010-099059
Apr. 22, 2010 (JP) .................. 2010-099060

(51) Int. Cl.
*G02B 13/18* (2006.01)
*H04N 5/225* (2006.01)

(52) U.S. Cl.
USPC ............ 359/716; 359/729; 359/796; 348/360

(58) Field of Classification Search
USPC ........... 359/716–719, 739, 740, 796; 348/360
See application file for complete search history.

(56) References Cited

U.S. PATENT DOCUMENTS

| 2009/0279188 | A1* | 11/2009 | Do ................................ 359/716 |
| 2010/0188555 | A1* | 7/2010 | Hirao et al. .................... 359/708 |
| 2010/0188556 | A1* | 7/2010 | Hirao et al. .................... 359/708 |

FOREIGN PATENT DOCUMENTS

| JP | 3976780 | 9/2007 |
| JP | 2009-222732 | 10/2009 |
| WO | WO 2009/004965 | 1/2009 |
| WO | WO 2009/004966 | 1/2009 |

\* cited by examiner

*Primary Examiner* — Evelyn A. Lester
(74) *Attorney, Agent, or Firm* — Cozen O'Connor

(57) ABSTRACT

Disclosed is an imaging lens by which astigmatism and field curvature are satisfactorily corrected by arranging on a first surface a concave surface having an appropriate radius of curvature. Condition (1) defines the radius of curvature of the concave surface arranged on the object-side surface of a bonded compound lens. By fulfilling condition (1), a lens can be obtained in which astigmatism and field curvature are satisfactorily corrected. Condition (1): $-1.5 < rL11/f < -5.0$, wherein rL11 is the local curvature radius of the object-side surface of the first lens calculated by the equation below; f is the focus distance of the entire system. $rL11 = \{(h1)2 + (s1)2\}/(2s1)$; h1 is 1/10 of the effective radius of the object-side surface of the first lens; and s1 is the displacement amount in a direction parallel to the optical axis from the surface apex point at a lens surface height h1.

18 Claims, 11 Drawing Sheets

F=2.88

SPHERICAL
ABERRATION (mm)

Y=0.714mm

ASTIGMATISM (mm)

Y=0.714mm

DISTORTION (%)

SPHERICAL ABERRATION (mm)

ASTIGMATISM (mm)

DISTORTION (%)

SPHERICAL ABERRATION (mm)

ASTIGMATISM (mm)

DISTORTION (%)

F=2.88

SPHERICAL
ABERRATION (mm)

Y=0.711mm

ASTIGMATISM (mm)

Y=0.711mm

DISTORTION (%)

F=2.88

— d line
--- g line

SPHERICAL
ABERRATION (mm)

Y=0.714mm

— S
--- M

ASTIGMATISM (mm)

Y=0.714mm

DISTORTION (%)

IMAGING LENS AND IMAGING DEVICE

RELATED APPLICATIONS

This is a U.S. National Phase Application under 35 USC 371 of International Application PCT/JP2011/053349 filed on Feb. 17, 2011.

This application claims the priority of Japanese Application Nos. 2010-041886 filed Feb. 26, 2010, 2010-041885 filed Feb. 26, 2010, 2010-099060 filed Apr. 22, 2010 and 2010-099059 filed Apr. 22, 2010, the entire contents of all of which are hereby incorporated by reference.

TECHNICAL FIELD

The present invention relates to a small and thin shaped imaging lens suitable for an imaging device using a solid-state image sensing element such as CCD (Charged Coupled Device) type image sensor or CMOS (Complementary Metal Oxide Semiconductor) type image sensor, and an imaging device equipped with the imaging lens.

BACKGROUND TECHNOLOGY

In recent years, cellular phones and portable information terminals equipped with the imaging device using the solid-state image sensing element, such as CCD type image sensor or CMOS type image sensor are spreading. Further these days, miniaturization of the solid-state image sensing element used for these imaging devices progresses, and for the sensor of VGA format of which effective image pixels are 640×480, the solid-state image sensing element of $\frac{1}{10}$ inch size (pixel pitch of 2.2 micrometers) or $\frac{1}{12}$ inch size (pixel pitch of 1.75 micrometers) is produced commercially. In connection with this, the demand to further miniaturization and the reduction in cost is increasing also to the imaging lens with which such imaging devices equip.

As the imaging lenses for such the use, single lens structured imaging lenses which can be miniaturized and are advantageous from a viewpoint of the reduction in cost are proposed rather than 2 lens structured imaging lenses. Further in recent years, like the wafer technology of an image pick-up sensor, methods for further reducing the cost by forming a plurality of such the small imaging lenses in bloc and individualizing them by cutting is proposed.

Thus, for attaining the cost reduction of the imaging lenses formed in block and individualized as mentioned above, it is effective to simultaneously mount the imaging lenses with other electronic components, such as IC chip on a substrate by using a reflow processing the substrate performed potting these components in advance. Therefore, it is attracted attentions that plural imaging lens formation using the joint type compound lens on which energy curable resin, such as light curable resin and heat curable resin, is pasted up on the surface of the glass substrate is adapted to the reduction in cost, and the reflow processing.

These joint type compound lens have a large merit in the points that they can be produced with a lower cost compared with glass mold lenses, that, with respect to the strength, they are superior to lenses integrally formed of resin, and that the further improvement of the optical characteristics and the further miniaturization can be attained because the optical characteristics can be adjusted with flexibility not only by the shapes of the lenses but also by the selection of the joining material. Some are known as a prior art of the imaging lens which consists of such a single joint type compound lens (for example, refer to the patent documents 1 and 2).

PRIOR ART DOCUMENTS

Patent Document

Patent Document 1: Japanese Patent Application Publication No. 2008-287005.
Patent Document 2: Japanese Patent Application Publication No. 2009-222732.

SUMMARY OF THE INVENTION

Problems to be Solved by the Invention

Although the imaging lens proposed here is a joint type compound lens which has the merit mentioned above, it is hard to say that the lens has improved the miniaturization and the high optical characteristic, especially the optical characteristics (an astigmatism, a distortion, and a coma aberration) from the middle image height to an off axis area which is the important optical characteristic for obtaining the miniaturization and the high definition image in the image format sensor like VGA. In these prior arts, in order to rectify the distortion and the astigmatism from the middle image height to the off axis area, concave meniscus is formed at the object side. However, there is no suggestion which is going to obtain a high definition image by an image format sensor like VGA, therefore the rectification of astigmatism and the distortion is insufficient. Further, it is inadequate also about the coma aberration rectification. Therefore, it cannot cope with the improvement in quality of image covering the circumference in such a wide angle lens of 57-65 degree diagonal which is normally required as an imaging element for cellular phones and the consideration is not shown at all. Therefore, they are not suitable for the use in which the subject image is formed on an imaging surface of the sensor of the image format like VGA which forms a high definition image.

The present invention was made in view of such problems, and is to provide an imaging lens which rectifies appropriately the astigmatism and the distortion even for the image format sensor like VGA while the cost reduction as joint type compound lenses with a form suitable for forming a plural imaging lenses in block is achieved and the flexibility of the optical characteristics and the size reduction are maintained; can rectify the coma aberration which is important for improving the image quality of the wide angle lens; and can offer an high definition image throughout the periphery, and an imaging device.

Means for Solving the Problems

The imaging lens of the present invention is an imaging lens comprising a single joint type compound lens for forming a subject image to a photoelectric conversion section of a solid-state image sensing element, the joint type compound lens including, in an order from an object side thereof; a first lens having a plane concave lens concave toward the object side, a second lens which is a parallel plate element, and a third lens having a convex lens convex toward an image side, wherein the first lens and the third lens are formed of energy curable resin, and the parallel plate element is formed of glass material, the first lens and the second lens are configured to be mutually joint and the second lens and the third lens are configured to be mutually joint, and the following conditional expression is satisfied:

$$-1.5 < rL11/f < -5.0 \quad (1)$$

where, f is a focal length of a whole system of the imaging lens and rL11 is a local curvature radius of an object side surface of the first lens calculated by the following formula:

$$rL11 = \{(h1)^2 + (s1)^2\}/(2s1)$$

where h1 is ⅒ of an effective radius in the object side surface of the first lens, and s1 is an amount of a displacement in a parallel direction of an optical axis from a surface apex at a height h1 of the object side surface of the first lens.

The joint type compound lens is configured to be a so called retro focus type by being provided with the concave surface at the object side surface and the convex surface at the image side surface thereof and is advantageous to rectify the astigmatism and the distortion because of being able to arrange a stronger concave surface for the same focal length. Further, since the first surface is concave, the effective aperture of the lens increases and the lens which is bright to the circumference can be obtained.

Further, the lens of which the astigmatism and the distortion are properly rectified can be obtained by satisfying the conditional expression (1). Specifically, the Petzval sum becomes small when rL11/f is less than the upper limit of the conditional expression (1), and the astigmatism and the distortion can be rectified. Further, the coma aberration can be prevented from becoming too much large when rL11/f exceeds the lower limit of the conditional expression (1), and also the whole length can be kept small.

The concave said here is the concave that $\phi m/\phi p$ becomes negative, where $\phi m$ represents the power of the imaging lens at the position of the maximum light ray height, and $\phi p$ represents the power of the imaging lens at the paraxial position (refer to Japanese Patent Application Publication No. 2004-326097). Further, the condition that "the first lens and the second lens are configured to be mutually joint and the second lens and the third lens are configured to be mutually joint" signifies not only the case that the first lens and the second lens are mutually joint directly and the second lens and the third lens are mutually joint directly, but also the case that they are mutually joint indirectly by being intervened by an aperture, i.e., the first aperture stop, other aperture stop, or a shielding member such as an IR cut coating.

Further, the "curvature radius" here is defined as a curvature radius representing the approximate value of the local curvature radius given by the following formula from the amount of the sag measured using the method of a contact type or the method of a non-contact type according to such as a high precision three-dimensional measurement machine UA3P (made by Panasonic Corporation):

$$rL11 = \{(h1)^2 + (s1)^2\}/(2s1)$$

where, h1 is ⅒ of the effective radius in the first lens object side surface, and s1 is an amount of displacement in the parallel direction to the optical axis from the surface apex at the height h1 of the first lens object side surface (refer to FIG. 22), and here the effective radius of the lens surface represents a distance from a point where a light ray which passes along a most periphery side (position most distant from the optical axis of the lens) among the total light ray which forms image at a maximum image height crosses the lens surface, to the optical axis in the perpendicular direction.

Further, according to the above-mentioned embodiment, it is preferable to satisfy the following conditional expressions:

$$30 \leq v1 \leq 59 \quad (2)$$

$$1.50 \leq N3 \leq 1.65 \quad (3)$$

where, v1 is an Abbe number of the material of the first lens, and N3 is a refractive index of the material of the third lens.

The above-mentioned conditional expression (2) and (3) have specified the Abbe number of the material used for the first lens of the joint type compound lens and the refractive index of the material used for the third lens. A coma aberration, a longitudinal chromatic aberration, and a magnification chromatic aberration can be rectified appropriately by using suitable material for the first lens and the third lens. Generating of chromatic aberrations can be suppressed by using the material for the first lens with the Abbe number which satisfies a conditional expression (2). Further, since the surface form can be made gradual by using the material for the third lens with the high refractive index which satisfies the conditional expression (3), generating of the coma aberration can be suppressed.

Further, according to the above-mentioned embodiment, it is preferable that the first aperture stop is arranged at the object side of the image side surface of the third lens, the second aperture stop which has a larger aperture diameter than the first aperture stop is arranged in addition to the first aperture stop, wherein the second aperture stop satisfies the following conditional expressions:

$$Ra < Ha \quad (4)$$

where, Ra is a radius of the second aperture stop, and Ha is a distance from the optical axis to the point where the light ray of a most periphery side at the maximum image height passes through the surface in which the second aperture stop is formed.

The above-mentioned conditional expression (4) specifies a radius of the second aperture stop of the joint type compound lens. Ha is the height where the most periphery side light ray of a light flux of a maximum image height passes through the surface where the second aperture stop is to be arranged in a case when the second aperture stop is not arranged and Ha can be obtained by tracing the general light ray. The present invention is explained with reference to FIG. 1. FIG. 1 shows the case where the second aperture stop is arranged at the image side surface of the second lens. In FIG. 1, the imaging lens has the first lens L1 which is a plane concave lens concave toward the object side, the second lens L2 which is a parallel plate element and the third lens L3 which is a plane convex lens convex toward the image side, and the first aperture stop SH1 is arranged at the object side of the second aperture stop SH2. Further, as shown in FIG. 1, in the second aperture stop, the radius of radius SH2 of the second aperture stop is represented as Ra, and a distance from the optical axis to a point where the light ray of the outmost side which has passed through the first aperture stop SH1 crosses a plane surface perpendicular to the optical axis at a position where the second aperture stop SH2 locates is represented as Ha. When the conditional expression (4) is satisfied at this time, the light ray of the periphery side which has passed through the first aperture stop SH1 will be intercepted by the second aperture stop SH2 as the double hatching shows. Further, the second aperture stop may be arranged at the object side of the first aperture stop. Since the F number is determined by the aperture stop of which aperture diameter is smaller, regardless of the back and forth position of the aperture stop, the aperture stop of which aperture radius is smaller serves as the first aperture stop, and, the aperture stop of which aperture radius is larger serves as the second aperture stop. When the second aperture stop has been arranged at the object side of the first aperture stop, the light ray of the most periphery side which enters into first aperture stop SH1 will be intercepted by the second aperture stop SH2.

Since the retro focus type imaging lens like the present invention has a high aperture efficiency, even if the light ray of the periphery side which has passed through the first aperture stop SH1 is cut, the lens sufficiently bright to the circumference can be obtained. On the other hand, since the coma aberration and high order aberration in the outside of the axis which are harmful to performance can be cut by arranging the second aperture stop SH2 which satisfies the conditional expression (4) in addition to the first aperture stop, the subject image with which the aberrations have been appropriately rectified to the circumference can be obtained. Further when the second aperture stop is nearer to the first aperture stop, the coma aberration and the high order aberration can be cut from the low image height and better performance to the circumference can be obtained, further since the light ray can be gradually cut from the low image height, the sudden fall of the amount of ambient light can be prevented, and the high quality imaging image to the periphery can be offered even if the size of the imaging lens is small.

Further, according to the above-mentioned embodiment, it is preferable that the first aperture stop is arranged on the object side surface or on the image side surface of the second lens.

Since the aperture efficiency goes up and the diameter of the second aperture stop can be made smaller by arranging the first aperture stop at the object side of the second lens compared with the case where the first aperture is arranged at the object side of the first surface of the joint type compound lens, good performance can be obtained. Further, there is an advantage that the sensor incidence angle can be made smaller, when the first aperture stop is arranged to more object side. It is further preferable that the second aperture stop is arranged at the image side of the second lens. The aperture stop can be formed accurately when the second aperture stop is arranged on the parallel plate element.

Since the aperture efficiency goes up and the diameter of the second aperture stop can be made smaller by arranging the first aperture stop at the image side of the second lens compared with the case where the first aperture is arranged at the object side of the first surface of the joint type compound lens, good performance can be obtained. Further, there is an advantage that a magnification chromatic aberration can be reduced because the light ray incidents lower to the image side surface of the third lens, when the first aperture is arranged at more image side. It is further preferable that the second aperture stop is arranged at the object side of the second lens. The second aperture stop can be formed more accurately when the second aperture stop is arranged on the parallel plate element.

Further, according to the above-mentioned embodiment, it is preferable to satisfy the following conditional expressions:

$$0.09 < rL32/rL11 < 0.29 \quad (5)$$

where rL32 is a local curvature radius given by the following formula of the image side surface of the third lens, and here rL32 is a local curvature radius given by the following formula:

$$rL32 = \{(h3)^2 + (s3)^2\}/(2s3)$$

where h3 is 1/10 of the effective radius in the image side surface of the third lens and s3 is a distance between a leg of a perpendicular line drawn to the optical axis from a surface apex at a height h3 of image side surface of the third lens and an apex of the image side surface.

The conditional expression (5) specifies a ratio of the curvature radius of the object side surface of the first lens of the joint type compound lens to the curvature radius of the image side surface of the third lens. By arranging the curvature radius of the image side surface of the third lens appropriately matching with the curvature radius of the object side surface of the first lens, the lens which secures a good performance suppressing a generating of the coma aberration while the whole length of the lens is kept small can be obtained. Specifically, when the value is less than the maximum of the conditional expression (5), the whole length can be kept small, and on the other hand, when the value exceeds the minimum, the generating of the coma aberration can be suppressed, thereby a good performance can be kept. In addition, rL32 is decided similar to rL11 with referring to FIG. 22.

The imaging lens of the present invention comprises: a first aperture stop for forming a subject image to a photoelectric conversion section of a solid-state image sensing element; a second aperture stop having a larger aperture radius than that of the first aperture stop; and a single joint type compound lens, wherein the joint type compound lens is constituted by, from an object side, a first lens of a plane concave lens concave toward the object side, a second lens which is a parallel plate element, and a third lens of a plane convex lens convex toward an image side; the first aperture is arranged at the object side of an image side surface of the third lens; the second aperture is arranged on an object side surface or an image side surface of the second lens; the first lens and the third lens are formed of energy curable resin; the parallel plate element is formed of glass material; the first lens and the second lens are configured to be mutually joint directly or indirectly; the second lens and the third lens are configured to be mutually joint directly or indirectly; and the following conditional expression is satisfied.

$$-1.5 < rL11/f < -5.0 \quad (1)$$

$$Ra < Ha \quad (6)$$

where rL11 is a local curvature radius of an object side surface of the first lens calculated by the following equation and f is a focal length of a whole system of the imaging lens:

$$rL11 = \{(h1)^2 + (s1)^2\}/(2s1)$$

where h1 is 1/10 of an effective radius in the object side surface of the first lens and s1 is an amount of a displacement in a parallel direction of the optical axis from a surface apex at a height h1 of the object side surface of the first lens:

where, Ra is a radius of the second aperture stop, and Ha is a distance from the optical axis to the point where the light ray of the most periphery side at the maximum image height passes through the surface on which the second aperture stop is formed.

The imaging lens of the present invention comprises: a first aperture stop for forming a subject image to a photoelectric conversion section of a solid-state image sensing element; a second aperture stop having a larger aperture radius than that of the first aperture stop; and a single joint type compound lens, wherein the joint type compound lens is constituted by, from an object side, a first lens of a plane concave lens concave toward the object side, a second lens which is a parallel plate element, and a third lens of a plane convex lens convex toward an image side; the first aperture is arranged at the object side of an image side surface of the third lens; the second aperture is arranged on an object side surface or an image side surface of the second lens; the first lens and the third lens are formed of energy curable resin; the parallel plate element is formed of glass material; the first lens and the second lens are configured to be mutually joint and the second lens and the third lens are configured to be mutually joint; and the following conditional expression is satisfied.

$$Ra<Ha \quad (6)$$

where Ra is a radius of the second aperture stop, and Ha is a distance from the optical axis to the point where the light ray of the most periphery side at the maximum image height passes through the surface on which the second aperture stop is formed:

Corresponding to the miniaturized solid-state image sensing element, the basic structure of the present invention for obtaining the imaging lens with which aberrations are properly rectified comprises a joint type compound lens in which, from the object side, the plane concave lens concave toward the object side, a parallel plate element, and a plane convex lens convex toward the image side are joint directly or indirectly. The imaging lens of the present invention is configured to be a so called retro focus type by arranging a concave face toward the image side and a convex surface toward the object side on the joint type compound lens and is advantageous for rectifying an astigmatism and a distortion because a steeper concave surface can be arranged for the same focal length. Further, because an aperture efficiency goes up, a lens brighter even to the circumference can be obtained.

Further, the conditional expression (6) specifies the radius of the second aperture stop arranged on the object side surface or the image side surface of the second lens of the joint type compound lens. Ha said here is a height where an most periphery side light ray of a light velocity of a maximum image height passes through the surface where the second aperture stop is to be arranged in a case when the second aperture stop is not arranged and Ha can be obtained by tracing a general light ray. The present invention is explained with reference to FIG. 2. FIG. 2 shows the case where the second aperture stop is arranged at the image side surface of the second lens. In FIG. 2, the imaging lens has the first lens L1 which is a plane concave lens concave toward the object side, the second lens L2 which is a parallel plate element, and the third lens L3 which is a plane convex lens convex toward the image side. Here, the second aperture stop SH2 is arranged on the image side surface of the second lens, and an aperture which determines an F number, that is the first aperture stop SH1, is arranged at the object side than the second aperture stop SH2. Further, as shown in FIG. 2, in the second aperture stop SH2, the radius of an aperture of the second aperture stop SH2 of the second aperture stop is represented as Ra, and a distance from the optical axis to a point a where a light ray of the outmost side which has passed through the first aperture stop SH1 crosses a plane surface perpendicular to the optical axis at a position where the second aperture stop SH2 locates is represented as Ha. When the conditional expression (6) is satisfied at this time, the light ray of the periphery side which has passed through the first aperture stop SH1 will be intercepted by the second aperture stop SH2 as the double hatching shows. Further, the second aperture stop may be arranged at the object side of the first aperture stop. Since the F number is determined by the aperture stop of which aperture diameter is smaller, regardless of the back and forth position of the aperture stop is, the aperture stop of which aperture radius is smaller serves as the first aperture stop, and, the aperture stop of which aperture radius is larger serves as the second aperture stop. When the second aperture stop has been arranged at the object side of the first aperture stop, the light ray of the most periphery side which enters into first aperture stop SH1 will be intercepted by the second aperture stop SH2.

Since the retro focus type imaging lens like the present invention has a high aperture efficiency, even if the light ray of the periphery side which has entered or has passed through the first aperture stop SH1 is cut, the lens sufficiently bright to the circumference can be obtained. On the other hand, since the coma aberration and high order aberration in the outside of the axis which are harmful to performance can be cut by arranging the second aperture stop SH2 which satisfies the conditional expression (6) on the image side surface or on the object side surface of the second lens L2, the subject image with which the aberrations have been appropriately rectified to the circumference can be obtained. Thus, by arranging the second aperture stop on the image side surface or on the object side surface of the second lens, the coma aberration and high order aberration can be cut from a lower image height and a good performance to the circumference can be obtained. When the coma aberration of the circumference can be suppressed, a curvature radius of the concaved surface can be steep, the focal length can be small, a lens of wider angle can be obtained and it is advantageous for reducing the whole length. Further because the light ray can be cut gradually from the low image height when the second aperture stop is nearer to the first aperture stop, the imaging lens has an advantage that a sudden fall of the light amount of the circumference can be prevented, a high quality image throughout the circumference can be obtained even if the size is small. Further, the condition that "the first lens and the second lens are configured to be mutually joint and the second lens and the third lens are configured to be mutually joint" signifies not only the case that the first lens and the second lens are mutually joint directly and the second lens and the third lens are mutually joint directly, but also the case that they are joint indirectly by being intervened by the first aperture stop, other aperture stop, or a shielding member such as an IR cut coating.

Further, according to the above-mentioned embodiment, it is preferable to satisfy the following conditional expressions:

$$-1.5<rL11/f<-22.0 \quad (7)$$

where rL11 is a curvature radius of the object side surface of the first lens, f is a focal length of a whole system of the imaging lens.

The conditional expression (7) has specified the curvature radius of the concave surface arranged on the object side surface of a joint type compound lens. The lens of which astigmatism and distortion are rectified can be obtained by satisfying the conditional expression (7). Specifically, the Petzval sum becomes small and the astigmatism and distortion can be rectified because rL11/f is less than the upper limit of the conditional expression (7) as shown in FIG. 3. Further, it can prevent a coma aberration from becoming large too much because rL11/f exceeds the lower limit of the conditional expression (7), and also the whole length can be kept small.

The concave said here is the concave that $\phi m/\phi p$ becomes negative, where $\phi m$ represents a power of the imaging lens at a position of a maximum light ray height, and $\phi p$ represents a power of the imaging lens at the paraxial position (refer to Japanese Patent Application Publication No. 2004-326097).

Further, the "curvature radius" here is defined as a curvature radius representing the approximate value of the local curvature radius given by the following formula from the amount of the sag measured using the method of a contact type or the method of a non-contact type according to such as high precision three-dimensional measurement machines UA3P (made by Panasonic Corporation):

$$rL11=\{(h1)^2+(s1)^2\}/(2s1)$$

where, h1 is 1/10 of the effective radius in the object side surface of the first lens, and s1 is an amount of displacement in the parallel direction to the optical axis at the height h1 from a surface apex of the first lens object side surface (refer to FIG. 22).

Here the effective radius of the lens surface represents a distance from a point where a light ray which passes along the most periphery side (position most distant from the optical axis of the lens) among the total light ray which carries out image formation at a maximum image height crosses the lens surface, to the optical axis in the perpendicular direction.

Further, according to the above-mentioned embodiment, it is preferable that the first aperture stop is arranged at the object side surface of the second lens and the second aperture stop is formed on the image side surface of the second lens.

Since the aperture efficiency goes up and the diameter of the second aperture stop can be made smaller by arranging the first aperture stop at the object side of the second lens compared with the case where the first aperture is arranged at the object side of the first surface of the joint type compound lens, good performance can be obtained. Further, there is an advantage that the sensor incidence angle can be made smaller. In this case, when the second aperture is arranged on the image side of the second lens, the aperture can be formed more accurately as the aperture is formed on the parallel plate.

Further, according to the above-mentioned embodiment, it is preferable that the first aperture stop is arranged on the image side surface of the second lens, and the second aperture stop is formed on the object side surface of the second lens.

Since the aperture efficiency goes up and the diameter of the second aperture stop can be made smaller by arranging the first aperture stop on the image side surface of the second lens, good performance can be obtained, compared with the case where the first aperture is arranged at the object side of the first surface of the joint type compound lens. Further, a magnification chromatic aberration can be reduced because the light my incidents lower to the image side surface of the third lens, when the first aperture is arranged at more imaging side. The aperture stop can be formed more accurately as the second aperture stop is arranged on the parallel plate element when the second aperture stop is arranged at the object side of the second lens.

Further, according to another embodiment of the present invention, it is characterized by satisfying the following conditional expression:

$$0.01<rL32/rL11<0.30 \tag{8}$$

where rL32 is a local curvature radius of the image side surface of the third lens image side calculated by the following equation:

$$rL32\{(h3)^2+(s3)^2\}/(2s3)$$

where h3 is 1/10 of the effective radius in the image side surface of the third lens, and s3 is a distance between a leg of a perpendicular line drawn to the optical axis from a surface apex at a height h3 of the image side surface of the third lens and an apex of the image side surface.

The conditional expression (8) specifies a ratio of the curvature radius of the object side surface of the first lens of the joint type compound lens to the curvature radius of the image side surface of the third lens. By arranging the curvature radius of the image side surface of the third lens appropriately matching with the curvature radius of the object side surface of the first lens, the lens which secures a good performance suppressing a generation of the coma aberration while the whole length of the lens is kept small can be obtained. Specifically, when the value is less than the maximum of the conditional expression, the whole length can be kept small, and on the other hand, when the value exceeds the minimum of the conditional expression, the generating of the coma aberration can be suppressed, thereby a good performance can be kept.

Further, according to the above mentioned embodiment, it is preferable to satisfy the following conditional expression:

$$0.25<dc/f<0.50 \tag{9}$$

where dc is a thickness of the above-mentioned parallel plate element, (however, in a case when there are two or more parallel plate elements, it is considered as the total).

The above-mentioned conditional expression (9) specifies a ratio of the thickness of the parallel plate element, to a focal length. By arranging the parallel plate element between the second lens and the solid-state image sensing element and making dc/f exceed the lower limit of the conditional expression (9), a distortion can be rectified further while suppressing the increase of astigmatism. On the other hand, by keeping dc/f to be less than the upper limit of the conditional expression (9), increase of the whole length of the imaging lens can be suppressed by the increase of the air conversion optical path length of the parallel plate element. In addition, it is also preferable that the parallel plate element includes a parallel plate such as an optical low pass filter, an infrared cut filter, or seal glass of the solid-state image sensing element package.

Further, according to the above mentioned embodiment, it is preferable to satisfy the following conditional expression.

$$0<(D1+D3)/D2<1 \tag{10}$$

where D1 is a thickness of the first lens on the paraxial in the direction of the optical axis, D2 is the thickness of the second lens on the optical axis in the direction of the optical axis, and D3 is a thickness of the third lens on the paraxial in the direction of an optical axis.

The conditional expression (10) specifies the ratio of the total thickness of the resin used for the first lens and the third lens to the thickness of the parallel plate element used for the second lens. In the joint type compound lens, if the resin is too thick compared to the parallel plate element, warpages and cracks of the parallel plate element will be problems at the time of molding. By making the ratio of thicknesses of lenses less than the upper limit value of the conditional expression (10), the lens of which parallel plate element does not curve and does not crack at the time of molding can be made. Especially when one side is a concave surface, it is preferable to satisfy the conditional expression (10) since the thickness balance easily looses. In addition, as for the optical axis thickness of the second lens, it is preferable to satisfy $0.3 \leq D2 \leq 0.7$, when considering that the imaging lens is miniaturized. In this case, since it is necessary to make substrate thickness against the resin portion thin in order to realize a miniaturization, the curvature is easily produced, and it is further preferable to satisfy the range of the following conditional expression (10'):

$$0<(D1+D3)/D2<0.8 \tag{10'}$$

Further, according to the above mentioned embodiment, it is preferable that at lease one of the object side surface of the first lens and the image side surface of the third lens includes an aspheric surface.

By making at least one of the object side surface of the first lens and the image side surface of the third lens of the joint type compound lens have a aspheric surface, various aberrations can be rectified because a suitable surface form respectively for each image height can be arranged.

Further, according to the above mentioned embodiment, it is preferable to use an odd order aspheric surface added an odd order term for at least one surface of the object side surface of the first lens and the image side surface of the third lens of the above.

By arranging the odd order aspheric surface added the odd order term for at least one surface of the object side surface of the first lens and the image side surface of the third lens, various aberrations can be properly rectified throughout the paraxial and the circumference, because a surface form can be appropriately arranged especially at the lower image height.

Further, for the above-mentioned joint type compound lens, it is preferable that after fabricating plural sets of the first lens and the third lens on a glass parallel plate element material, a plurality of joint type compound lens is manufactured by cutting the glass parallel plate element material into each set. Thereby, the imaging lenses can be mass produced in one process.

The imaging device of the present invention is characterized by equipping an imaging element of which sensor size is 1/10 inch size (pixel pitch of 2.2 micrometers) and the above-mentioned imaging lens. For the size of a small imaging lens here, there is a tendency that a cellular-phone makers ask for an imaging device of which the whole length is less than 3.0 mm, further in addition to the whole length of the imaging lens, the thickness of 0.3 mm for the solid state imaging element, and the thickness of 0.2 mm for the cover member which protects the imaging lens are further required. For the imaging lens of the present invention, the miniaturization satisfying the conditional expression (13) in the operation conditions of (11) and (12) is aimed although the present invention is not limited to the conditional expressions of (11), (12) and (13):

$$2.4 \leq Fno \leq 3.2 \tag{11}$$

$$1.4 \ \mu m \leq P \leq 2.2 \ \mu m \tag{12}$$

$$1.0 \ mm < TTL < 2.5 \ mm \tag{13}$$

where Fno is an F number of the imaging lens, P is the pixel pitch of the solid state image sensing element, and TTL is a distance from a lens surface of a most object side of the whole system of the imaging lens to a focal point of the image side on the optical axis (Here, the "focal point of the image side" means a focal point when parallel light ray parallel to the optical axis enters into the imaging lens.)

Effect of the Invention

According to the present invention, it is possible to reduce the cost of the joint type compound lens, to rectify especially a coma aberration properly to supply a high quality image even in an image format sensor like VGA, and to supply a good quality image throughout the circumferences even in a wide angle lens, while the size is maintained small and the flexibility of optical performance is maintained.

BRIEF DESCRIPTIONS OF THE DRAWINGS

Figure 7A:
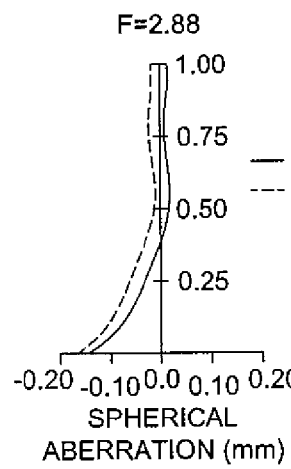
Figure 7B:
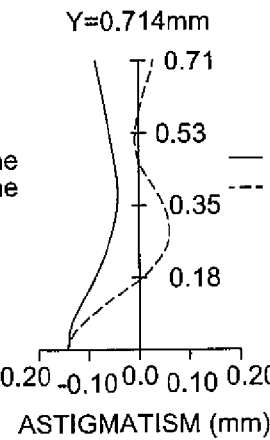
Figure 7C:
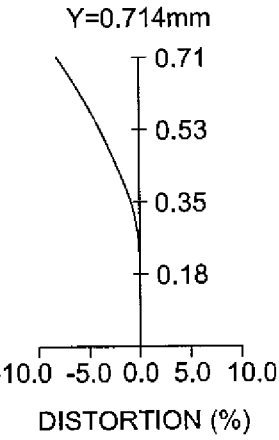

FIGS. 7a, 7b, and 7c are aberration drawings of the example 1.

Figure 8:
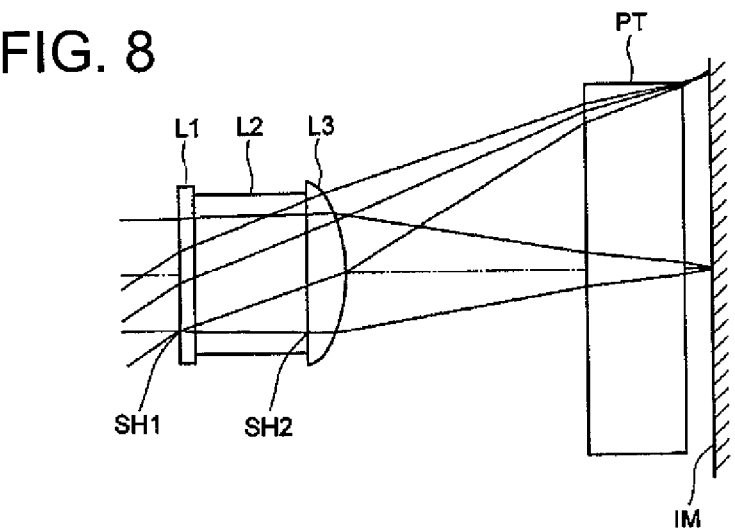

FIG. 8 is a sectional view of the imaging lens of the example 2.

Figure 9A:
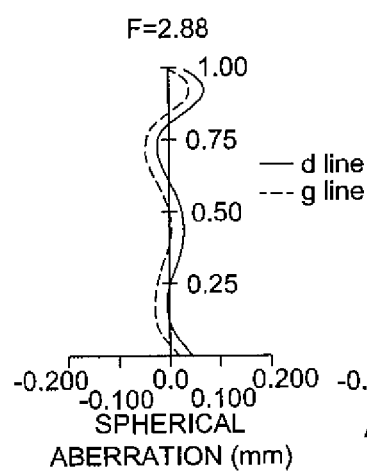
Figure 9B:
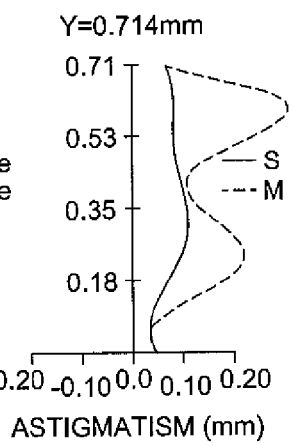
Figure 9C:
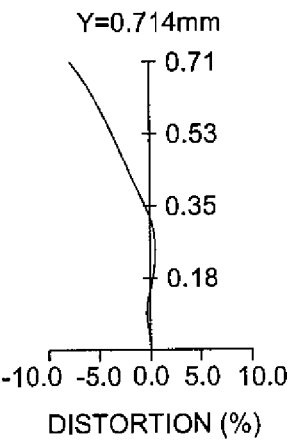

FIGS. 9a, 9b, and 9c are aberration drawings of the example 2.

Figure 10:
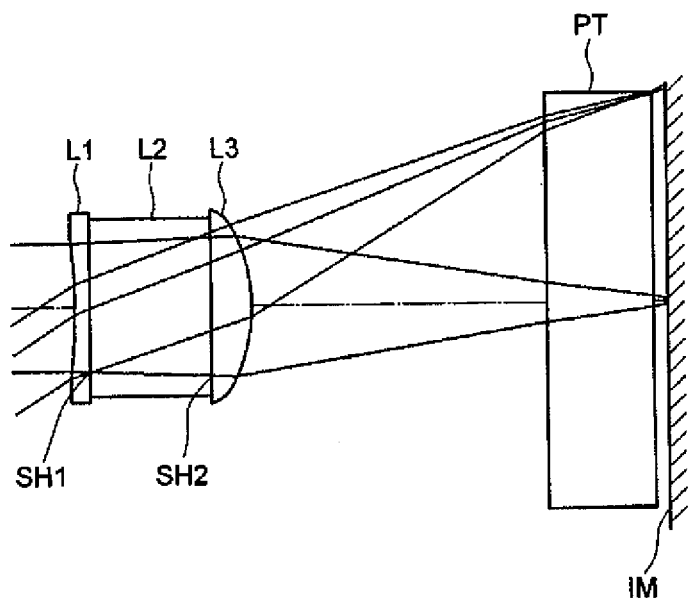

FIG. 10 is a sectional view of the imaging lens of the example 3.

Figure 11A:
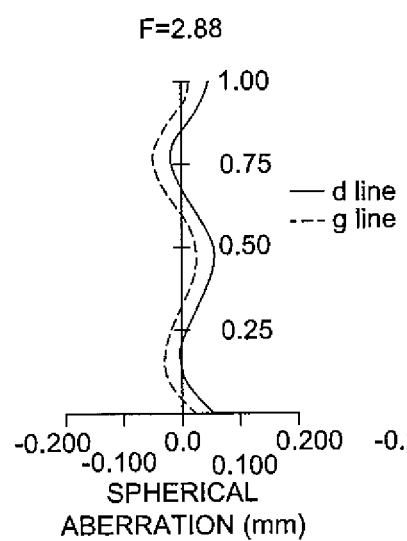
Figure 11B:
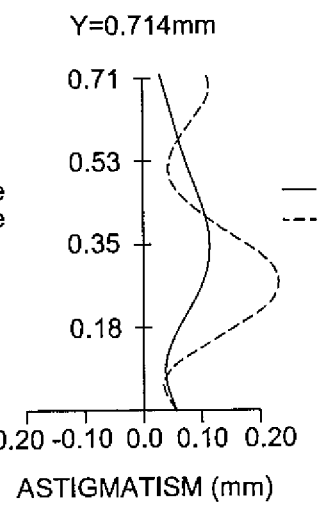
Figure 11C:
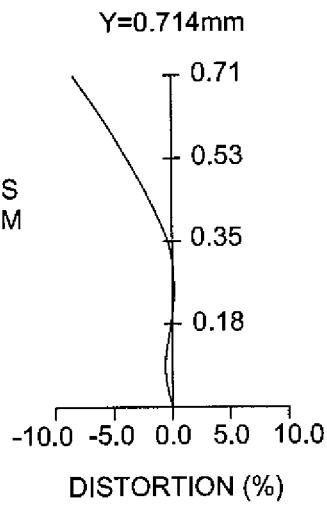

FIGS. 11a, 11b, and 11c are aberration drawings of the example 3.

Figure 12:
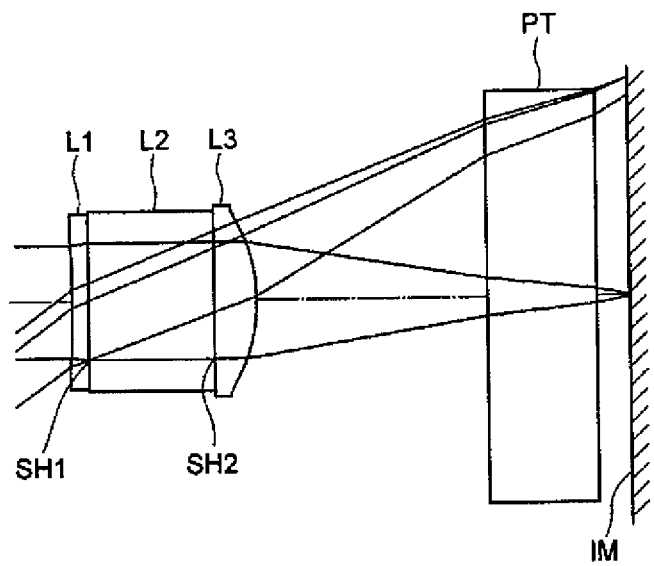

FIG. 12 is a sectional view of the imaging lens of the example 4.

Figure 13A:
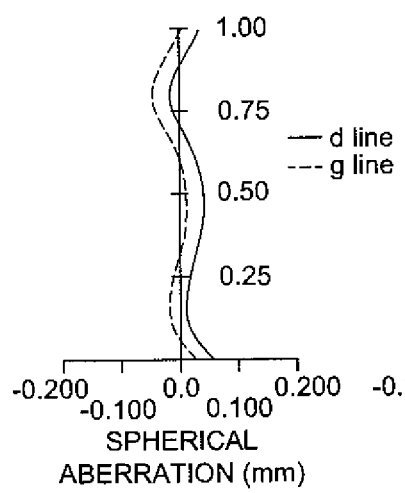
Figure 13B:
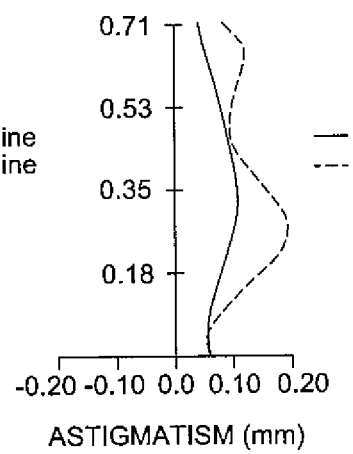
Figure 13C:
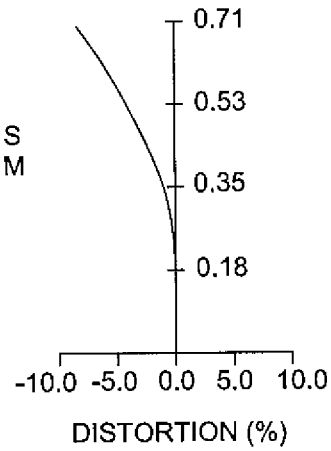

FIGS. 13a, 13b, and 13c are aberration drawings of the example 4.

Figure 14:
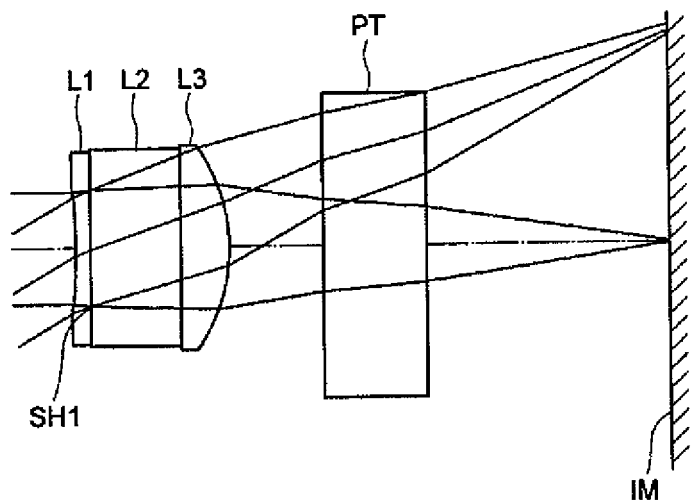

FIG. 14 is a sectional view of the imaging lens of the example 5.

Figure 15A:
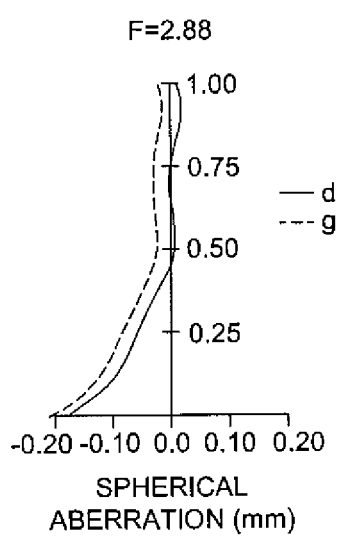
Figure 15B:
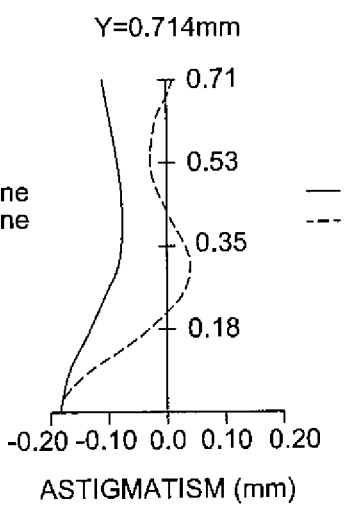
Figure 15C:
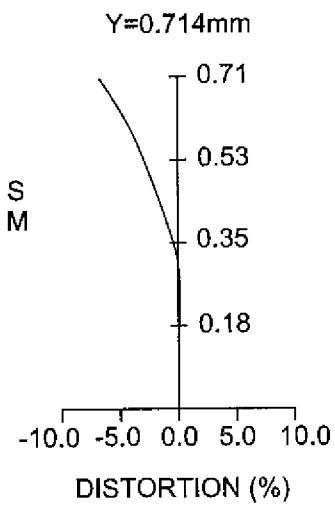

FIGS. 15a, 15b, and 15c are aberration drawings of the example 5.

Figure 16:
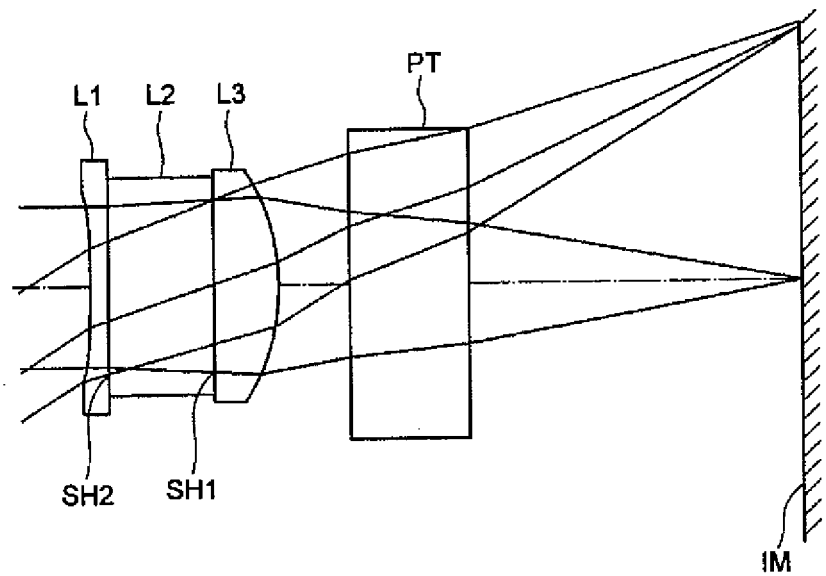

FIG. 16 is a sectional view of the imaging lens of the example 6.

Figure 17A:
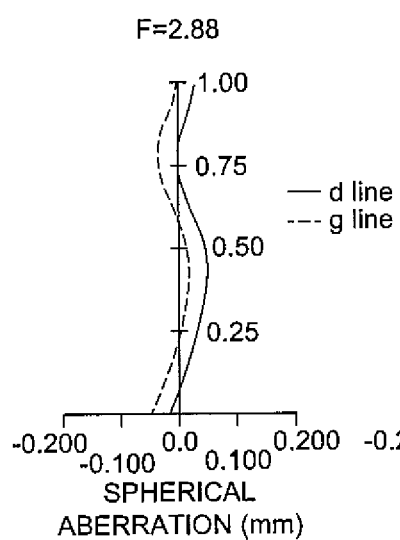
Figure 17B:
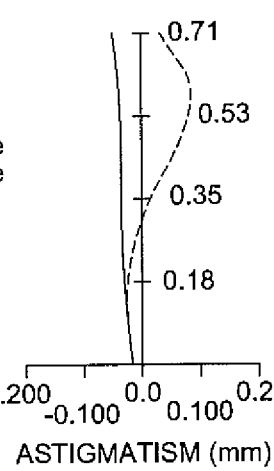
Figure 17C:
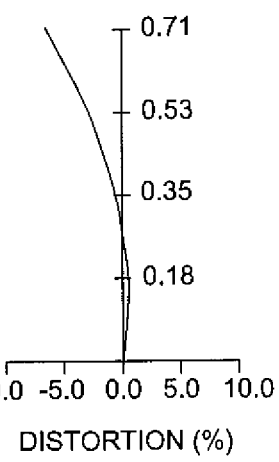

FIGS. 17a, 17b, and 17c are aberration drawings of the example 6.

Figure 18:
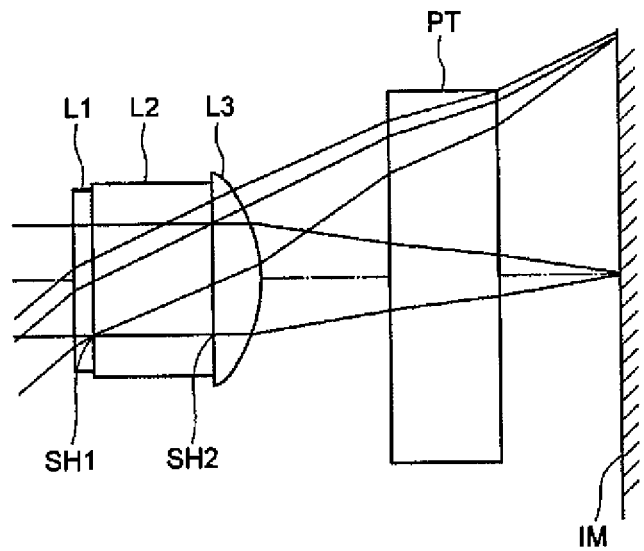

FIG. 18 is a sectional view of the imaging lens of the example 7.

Figure 19A:
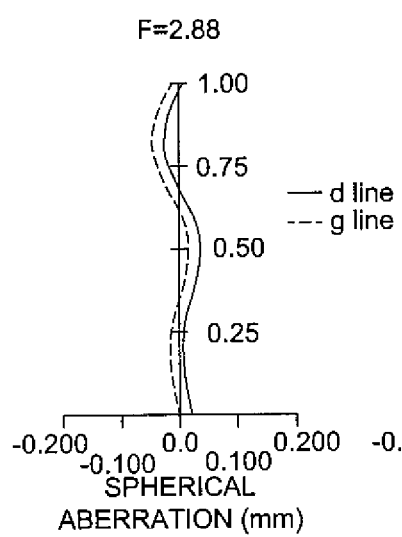
Figure 19B:
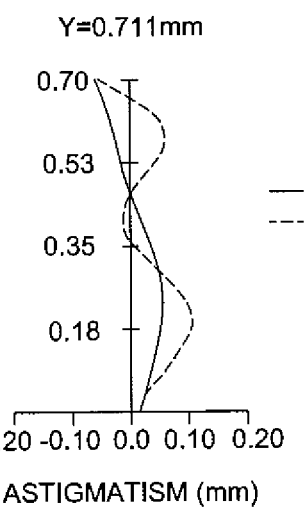
Figure 19C:
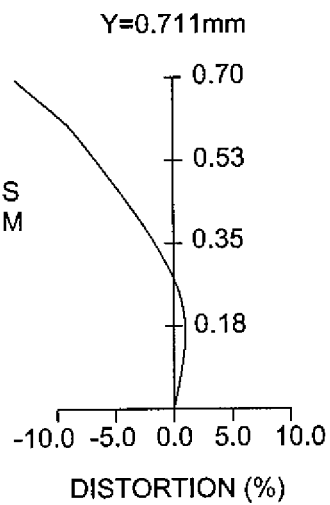

FIGS. 19a, 19b, and 19c are aberration drawings of the example 7.

Figure 20:
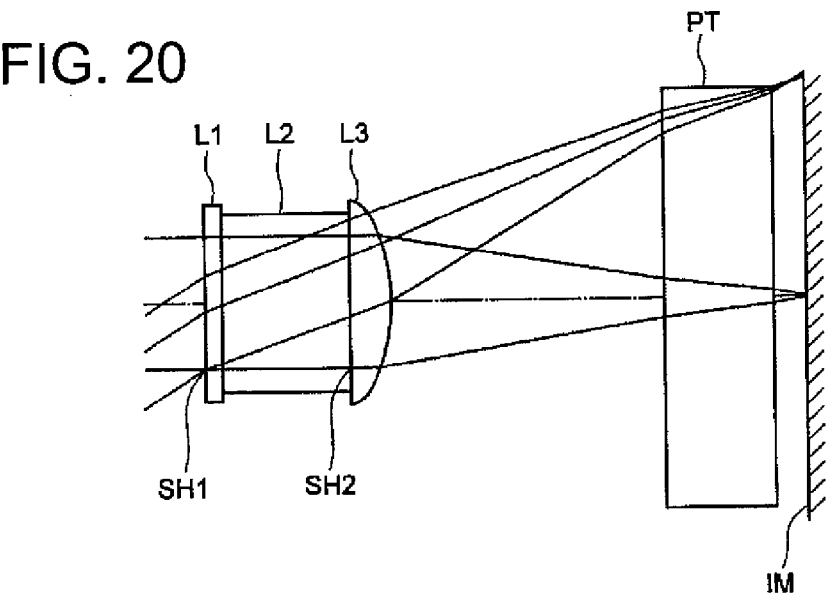

FIG. 20 is a sectional view of the imaging lens of the example 8.

Figure 21A:
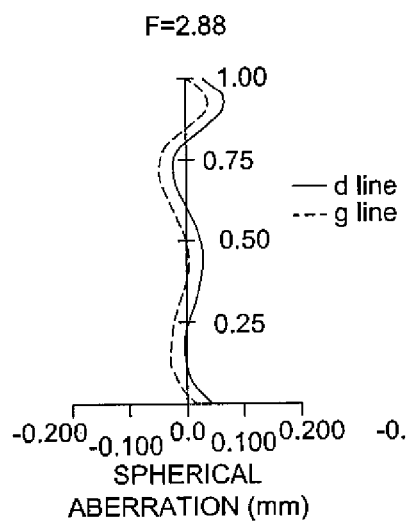
Figure 21B:
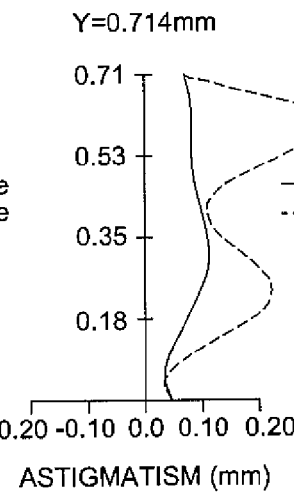
Figure 21C:
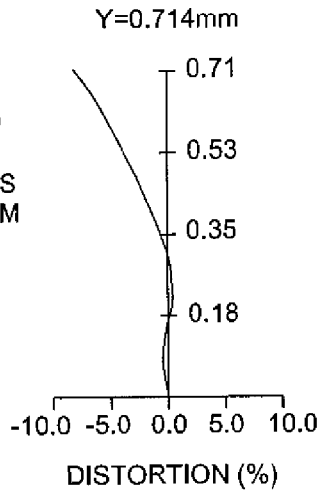

FIGS. 21a, 21b, and 21c are aberration drawings of the example 8.

Figure 22:
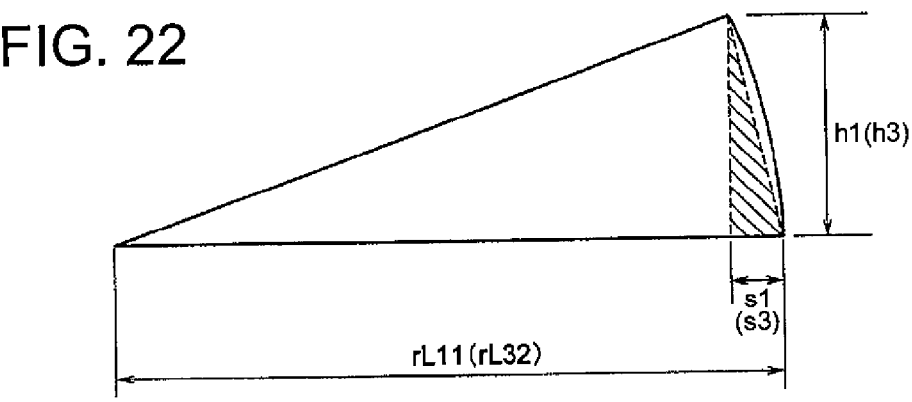

FIG. 22 is a drawing which specifies the amount of sag.

PREFERRED EMBODIMENTS OF THE PRESENT INVENTION

First Embodiment

Hereafter, the first embodiment is explained with reference to drawings. The imaging lens of the present invention and the imaging device using the imaging lens are explained with reference to FIG. 3. The imaging lens comprises: a joint type compound lens CL which includes, in an order from the object side, a first lens L1 which is a plane concave lens concave toward the object side, a first aperture stop SH1 specifying an F number, a second lens L2 which is a parallel plate element, a second aperture stop SH2, and a third lens L3 which is a plane convex lens convex toward the image side; and a parallel plate element PT which includes an optical low pass filter, an IR cut filter, or a seal glass for a solid-state image sensing element. Further, the third lens L3 has a leg portion L3a which contacts the parallel plate element PT. Further, the first aperture stop SH1 may be arranged on the object side surface of the second lens L2 or on the image side surface of the second lens L2. Further, the second aperture stop SH2 may be arranged on an object side surface of the second lens L2, and it may not be arranged. Further, the imaging lens satisfies the following conditional expressions:

$$-1.5 < rL11/f < -5.0 \tag{1}$$

where, f is a focal length of a whole system of the imaging lens and rL11 is a local curvature radius of an object side surface of the first lens calculated by the following formula:

$$rL11=\{(h1)^2+(s1)^2\}/(2s1)$$

where h1 is 1/10 of an effective radius at the object side surface of the first lens, and s1 is an amount of a displacement in a parallel direction of an optical axis from a surface apex at the height h1 of the object side surface of the first lens.

Each of the optical elements is held by a lens frame 11. Further, the imaging element C which has an imaging surface on which a subject image is formed has a sensor size below 1/10 inch size (pixel pitch of 2.2 micrometers) and is mounted in the printed wiring board 12, and the printed wiring board 12 is fixed to the lens frame 11. The imaging device is constituted as described above.

Figure 4A:
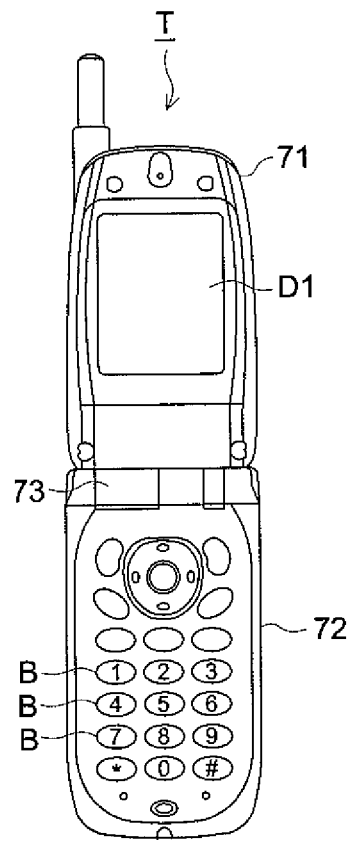
FIGS. 4a and 4b are external views of a cellular phone.
Figure 4B:
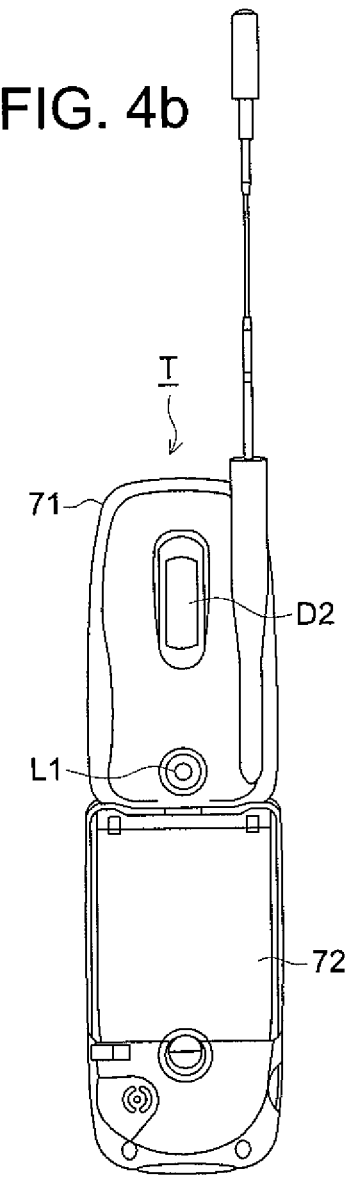

Next, a cellular phone equipped with the imaging device is explained based on the external view of FIGS. 4a and 4b as an example of the portable information terminal equipped with the imaging device. In addition, FIG. 4a is a drawing viewing from the inner side of the folding cellular phone in an open state, and FIG. 4b is a drawing viewing from the outside of the folding cellular phone in the open state.

In FIGS. 4a and 4b, in the cellular phone T, the upper case 71 as a case equipped with the display screens D1, D2, and the lower case 72 equipped with manual operation button B are connected through the hinge 73. The camera module is built in under the display screen D2 in the upper case 71, and the first lens L1 of the imaging lens has exposed at an outer surface of the upper case 71.

Further, the imaging device may be arranged on the upper part or the side of the display screen D2 in the upper case 71. Further, the cellular phone T is not limited to the folding type.

Figure 5A:
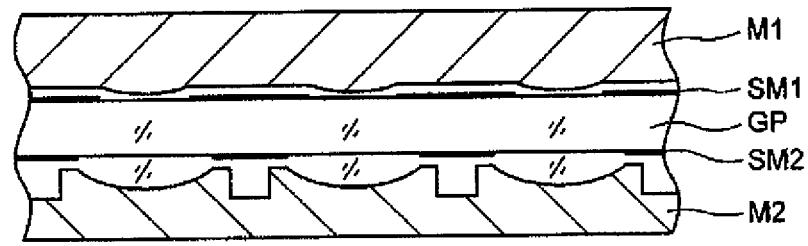
FIGS. 5a and 5b are drawings showing a production method of an imaging lens.
Figure 5B:
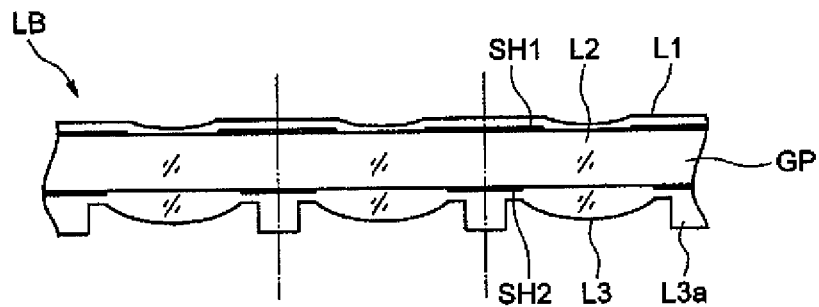

Then, the production method of the joint type compound lens CL is explained with reference to FIGS. 5a and 5b. In cases of examples 1-5, the first aperture stop is prepared on the object side surface of the second lens L2, and the first aperture stop is prepared on the image side surface of the second lens L2 in a case of an example 6. As shown in FIG. 5a, when forming the first lens L1, an aperture member with plural apertures of a predetermined diameter each of which functions as the first aperture stop is formed on an upper surface of the glass parallel plate material GP with a thin film (black resist etc.) which has a light blocking performance, and then the first lens L1 is formed by carrying out an imprint forming to cure photo-curable resin or heat curable resin being arranged between the aperture member and the molding die M1 which molds lenses. Further, in forming the third lens L3, as same as described above for the first aperture, an aperture member which function as the second aperture is formed with a film having a light blocking performance on a bottom surface of the glass parallel plate material GP and the third lens L3 is formed by facing the molding die M2 having plural transfer surfaces by cure molding like the first lens L1, while the aperture member (only in the case that the second aperture stop is included) is matched with the surface of the molding die M1 about the optical axis.

Then, when the molding dies M1 or M2 are separated, the first lenses L1 molded by the transfer surface of the molding die M1 are formed in a shape of array on the upper surface of the parallel plate material GP, and the third lenses L3 (including leg portions L3a) molded by the transfer surfaces of the molding die M2 are formed in a shape of array on the bottom surface of the parallel plate material GP. Namely, as shown in FIG. 5b, the lens block LB arranging plural joint type compound lenses CL in a shape of array is formed.

Then, the position shown by the dashed dotted line is cut by a cutter. That is, the joint type compound lenses are cut in two directions orthogonal each other when seen from the upper side of FIG. 5b into cuboids though the lens surface of the joint type compound lens is round, and while the outer shape is maintained, the joint type compound lens is inserted into the lens frame L11 which has a square barrel shape (refer to FIG. 3). By manufacturing like this, imaging lenses capable of forming high accurate images can be mass-produced with a low cost Second Embodiment Hereafter, the second embodiment is explained with reference to drawings.

Figure 1:
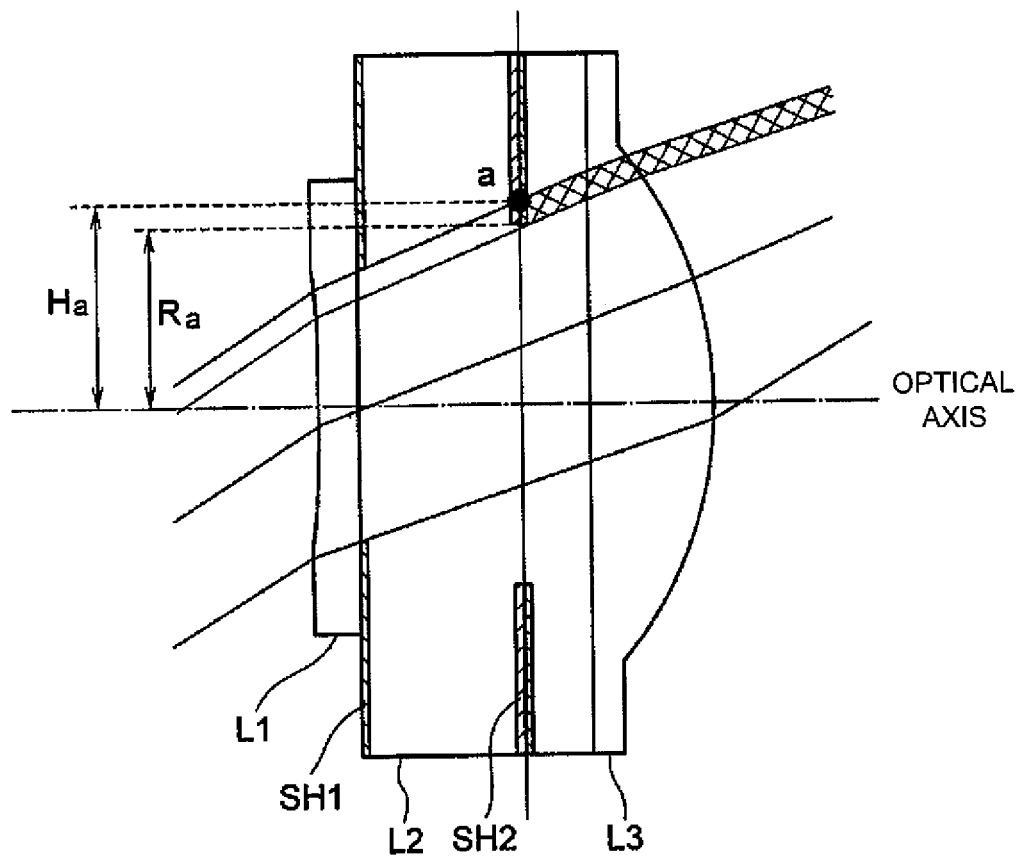
FIG. 1 is a drawing for explaining the principle of the first embodiment concerning the present invention.
Figure 2:
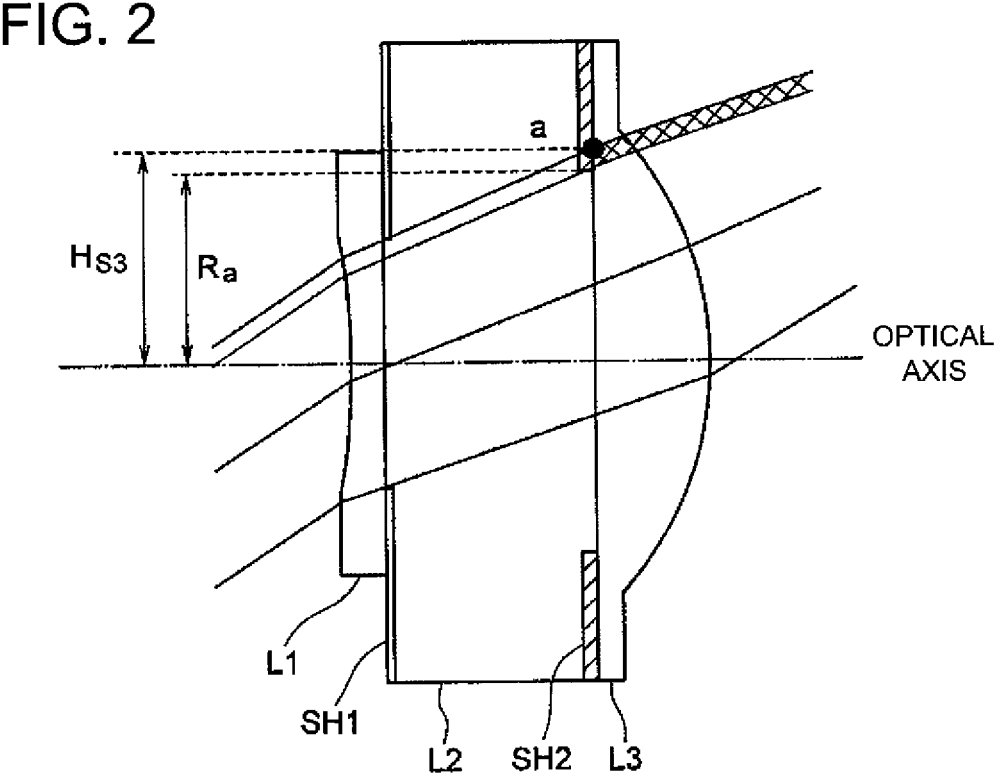
FIG. 2 is a drawing for explaining the principle of the second embodiment concerning the present invention.
Figure 3:
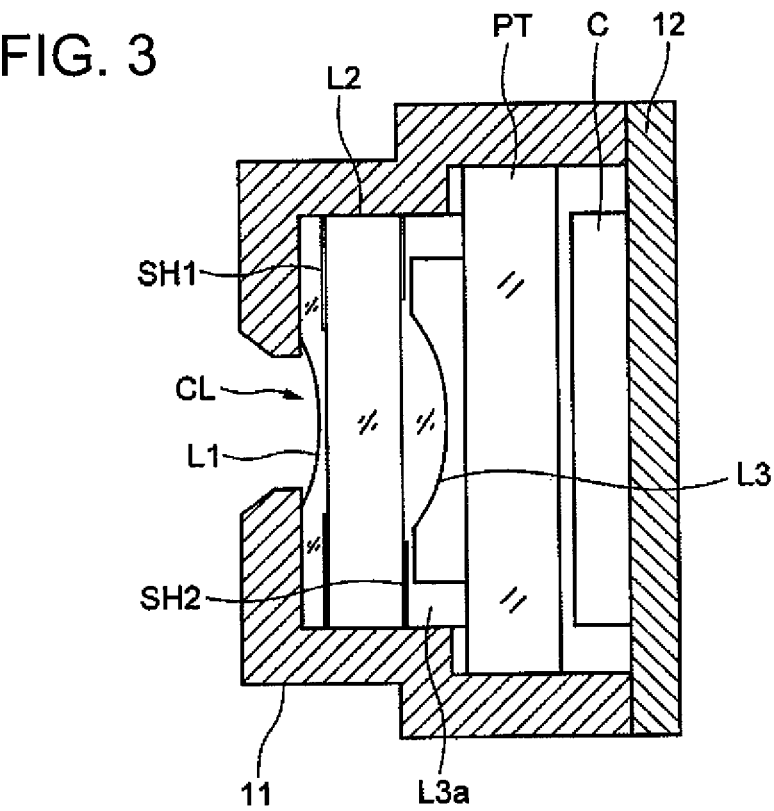
FIG. 3 is a sectional view of the imaging device.

The imaging lens of the present invention and the imaging device using the imaging lens are explained with reference to FIG. 3. The imaging lens comprises: a joint type compound lens CL which includes, in an order from the object side, a first lens L1 which is a plane concave lens concave toward the object side, a first aperture stop SH1 specifying an F number, a second lens L2 which is a parallel plate element, a second aperture stop SH2, and a third lens L3 which is a plane convex lens convex toward the image side; and a parallel plate element PT which include an optical low pass filter, an IR cut filter or a seal glass for a solid-state image sensing element Further, the third lens L3 has a leg portion L3a which contacts the parallel plate element PT. Further, the first aperture stop SH1 may be arranged on the image side of the second lens L1 or on the object side of the second lens L2. Further, the second aperture stop SH2 may be arranged on the image side of the lens L2. Or the second aperture stop SH2 may be arranged on the image side of the lens L1 or on the object side of the lens L2. Further, the imaging lens satisfies the following conditional expressions:

$$Ra<Ha \tag{6}$$

where Ra is a radius of the second aperture stop, and Ha is a distance from the optical axis to the point where the light ray of the most periphery side at the maximum image height passes through the surface on which the second aperture stop is formed.

As other constitutions of the imaging device are same as other constitutions of the first embodiment, the explanation is skipped. Further the cellular phone equipped with the imaging device is also same as the cellular phone of the first embodiment, the explanation is skipped.

Then, the production method of the joint type compound lens CL is explained with reference to FIGS. 5a and 5b. The first aperture stop is prepared in the object side of the second lens L2, and the second aperture stop is prepared in the image side of the second lens L2 in cases of examples 7 and 8. As shown in FIG. 5a, when forming the first lens L1, an aperture member with plural apertures of a predetermined diameter each of which functions as the first aperture stop is formed on an upper surface of the glass parallel plate material GP with a thin film (black resist etc.) which has a light blocking performance, and then the first lens L1 is formed by carrying out an imprint forming to cure photo-curable resin or heat curable resin being arranged between the aperture member and the molding die M1 which molds lenses. Further, in forming the third lens L3, as same as described above for the first aperture, an aperture member which function as the second aperture is formed with a film having a light blocking performance on a bottom surface of the glass parallel plate material GP and the third lens L3 is formed by facing the molding die M2 having plural transfer surfaces by cure molding like the first lens L1, while the aperture member (only in the case that the second aperture stop is matched with the surface of the molding die M1 about the optical axis.

Then, when the molding dies M1 or M2 are separated, the first lenses L1 molded by the transfer surface of the molding die M1 are formed in a shape of array on the upper surface of the parallel plate material GP, and the third lenses L3 (including leg portions L3a) molded by the transfer surfaces of the molding die M2 are formed in a shape of array on the bottom surface of the parallel plate material GP. Namely, as shown in FIG. 5b, the lens block LB arranged plural joint type compound lenses CL in a shape of array is formed.

Then, the position shown by the dashed dotted line is cut by a cutter. That is the joint type compound lenses are cut in two directions orthogonal each other when seen from the upper side of FIG. 5b into cuboids though the lens surface of the joint type compound lens is round and, while the outer shape is maintained, the joint type compound lens is inserted into the lens frame L11 which has a square barrel shape (refer to FIG. 3). By manufacturing like this, imaging lenses capable of forming high accurate images can be mass-produced with a low cost.

EXAMPLES

Examples of the imaging lens of the present invention are shown below. The symbols used for each examples are as the following:

FL: focal length of the whole system of the imaging lens
Fno: F number
ymax: Image pick-up surface diagonal line length of a solid-state image sensing element
w: Half-field angle
TL: distance on the optical axis from the lens surface of the most object side to the focal point of the image side of the whole system of the imaging lens
BF: Back focus
r: Curvature radius
d: Surface interval on the axis
nd: The refractive index to d line of lens material
vd: The Abbe number to d line of lens material Further, second aperture stop SH2 is formed in the surface where "*" is indicated after the effective radius. The radius is made into the same value as the effective radius, and the surface indicated as "SPS" after each surface number is a surface which has an aspheric shape, and the shape of the aspheric surface is represented by the following Formula 1 by making the apex of the surface an original point, setting an X-axis in the direction of the optical axis, and setting a height perpendicular to the X-axis as h.

$$X = \frac{h^2/R}{1 + \sqrt{1 - (1+K)h^2/R^2}} + \sum A_i h^i \quad \text{[Formula 1]}$$

where, $A_i$ is an aspheric coefficient of i-th order (i=3, 4, 5, 6, ..., 20); R (r in the lens data tables) is a curvature radius; and K is a conic constant.

Further, in the aspheric coefficient, decimal numbers in exponential form (for example, $2.5 \times 10^{-02}$) are expressed by using E (for example, 2.5E-02).

Example 1

Figure 6:
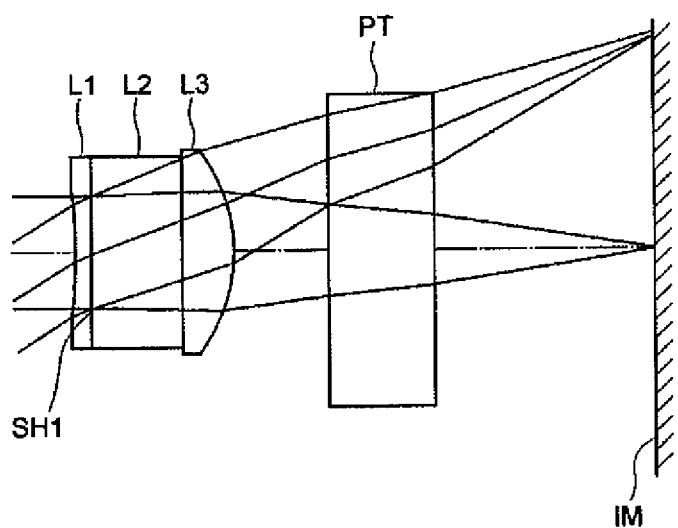
FIG. 6 is a sectional view of the imaging lens of the example 1.

The lens data of the example 1 is shown in Table 1. FIG. 6 is a sectional view of the imaging lens of Example 1. FIGS. 7(a), 7(b), 7(c) are drawings of aberrations ((a) spherical aberration, (b) astigmatism, and (c) distortion) of Example 1. Here, in the drawing of the spherical aberration, the solid line represents a d line, and the dotted line represents an amount of a spherical aberration for a g line and, in the drawing of astigmatism, the solid line represents an sagital surface and the dotted line represents a meridional surface. (the same hereafter). The imaging lens of Example 1 comprises, from the object side, a first lens L1 which is a plane concave lens concave toward the object side, a first aperture SH1 which specifies an F number, a second lens L2 which is a parallel plate element, a third lens L3 which is a plane convex lens convex toward the image side, and a parallel plate element PT which includes an optical low pass filter, an IR cut filter, or a seal glass for a solid-state image sensing element. IM is an imaging surface of the image sensing element. Further, all the surfaces of the lens part which touches the air have aspheric shapes.

Example 1

TABLE 1

SURF DATA

| NUM. | r | d | nd | vd | Effective radius |
|---|---|---|---|---|---|
| OBJ | INFINITY | 400.0000 | | | |
| 1SPS | −5.7280 | 0.0500 | 1.48250 | 48.79 | 0.2105 |
| STO | INFINITY | 0.3000 | 1.52000 | 61.99 | 0.1902 |
| 3 | INFINITY | 0.1623 | 1.53500 | 51.99 | 0.3173 |
| 4SPS | −0.5458 | 0.3062 | | | 0.3393 |
| 5 | INFINITY | 0.3500 | 1.47140 | 66.01 | 4.4568 |
| 6 | INFINITY | 0.7210 | | | 0.5226 |
| IMG | INFINITY | | | | |

ASPHERICAL SURFACE

1  K = 3.00000e+001, A3 = −3.50633e+000, A4 = 7.99560e+001,
   A5 = −8.52003e+002, A6 = 3.53656e+003, A7 = 0.00000e+000,
   A8 = −2.30188e+004, A9 = 0.00000e+000, A10 = −2.84370e+005,
   A11 = 0.00000e+000 A12 = 1.06061e+007, A13 = 0.00000e+000,
   A14 = −8.76927e+007, A15 = 0.00000e+000, A16 = 3.68528e+007
   A17 = 0.00000e+000, A18 = 0.00000e+000, A19 = 0.00000e+000,
   A20 = 0.00000e+000
4  K = −2.01118e+001, A3 = −3.30693e−001, A4 = 4.04909e+000,
   A5 = −1.47009e+002, A6 = 6.30980e+002, A7 = 0.00000e+000,
   A8 = −2.07717e+003, A9 = 0.00000e+000, A10 = −4.57892e+004,
   A11 = 0.00000e+000 A12 = 8.12886e+005, A13 = 0.00000e+000,
   A14 = −4.08553e+006, A15 = 0.00000e+000, A16 = −7.63547e+006
   A17 = 0.00000e+000, A18 = 1.21349e+008, A19 = 0.00000e+000,
   A20 = −2.45151e+008

| | |
|---|---|
| FL | 1.0824 |
| Fno | 2.8800 |
| w | 33.41 |
| y max | 0.714 |
| TL | 1.8895 |
| BF | 0.721 |

Example 2

The lens data of the example 2 is shown in Table 2. FIG. 8 is a sectional view of the imaging lens of the example 2. FIGS. 9a, 9b, and 9c are aberration drawings (spherical aberration (a), astigmatism (b), and distortion (c)) of the example 2. The imaging lens of the example 2 comprises, from the object side, a first aperture stop SH1 which specifies an F number, a first lens L1 which is a plane concave lens concave toward the object side, a second lens L2 which is a parallel plate element, a second aperture stop SH2, a third lens L3 which is a plane convex lens convex toward the image side, and a parallel plate element PT which consists of an optical low pass filter, an IR cut filter or a seal glass of a solid-state image sensing element, IM represents an image pick-up surface of the image sensor. Further, all the surfaces of the lens part which touch the air have aspherical shapes.

Example 2

TABLE 2

Reference Wave Length = 587.56 nm

SURF DATA

| NUM. | r | d | nd | vd | Effective radius |
|---|---|---|---|---|---|
| OBJ | INFINITY | 400.0000 | | | |
| STO | INFINITY | 0.0000 | | | 0.2075 |
| 2SPS | −4.7326 | 0.0500 | 1.51621 | 56.22 | 0.2101 |
| 3 | INFINITY | 0.4000 | 1.52000 | 61.99 | 0.2137 |
| 4 | INFINITY | 0.1279 | 1.51621 | 56.22 | 0.2700* |
| 5SPS | −0.5676 | 0.8618 | | | 0.2915 |
| 6 | INFINITY | 0.3500 | 1.47140 | 66.01 | 0.6007 |
| 7 | INFINITY | 0.1.003 | | | 0.6771 |
| IMG | INFINITY | | | | |

ASPHERICAL SURFACE

2  K = −3.00000e+001, A3 = 8.23100e−001, A4 = −3.89739e+000,
   A5 = 0.00000e+000, A6 = −1.79616e+002, A7 = 0.00000e+000,
   A8 = 1.97326e+004, A9 = 0.00000e+000, A10 = −6.89052e+005,
   A11 = 0.00000e+000 A12 = 9.45671e+006, A13 = 0.00000e+000,
   A14 = −4.06084e+007, A15 = 0.00000e+000, A16 = 0.00000e+000
   A17 = 0.00000e+000, A18 = 0.00000e+000, A19 = 0.00000e+000,
   A20 = 0.00000e+000
5  K = −2.11093e+001, A3 = −6.37800e−001, A4 = 4.31032e−001,
   A5 = 0.00000e+000, A6 = −3.33364e+002, A7 = 0.00000e+000,
   A8 = 1.16836e+004, A9 = 0.00000e+000, A10 = −1.62564e+005,
   A11 = 0.00000e+000 A12 = 5.33447e+005, A13 = 0.00000e+000,
   A14 = 7.09014e+006, A15 = 0.00000e+000, A16 = −4.81212e+007
   A17 = 0.00000e+00, A18 = 0.00000e+000, A19 = 0.00000e+000,
   A20 = 0.00000e+000

| FL | 1.1930 |
|---|---|
| Fno | 2.8800 |
| w | 33.78 |
| y max | 0.714 |
| TL | 1.890 |
| BF | 0.100 |

Example 3

The lens data of the example 3 is shown in Table 3. FIG. 10 is a sectional view of the imaging lens of the example 3. FIGS. 11*a*, 11*b*, and 11*c* are aberration drawings (spherical aberration (a), astigmatism (b), and distortion (c)) of the example 3. The imaging lens of the example 3 comprises, from the object side, a first lens L1 which is a plane concave lens concave toward the object side, a first aperture stop SH1 which specifies an F number, a second lens L2 which is a parallel plate element, a second aperture stop SH2, a third lens L3 which is a plane convex lens convex toward the image side, and a parallel plate element PT which consists of an optical low pass filter, an IR cut filter or a seal glass of a solid-state image sensing element. IM represents an image pick-up surface of the image sensor. Further, all the surfaces of the lens part which touch the air have aspherical shapes.

Example 3

TABLE 3

Reference Wave Length = 587.56 nm

SURF DATA

| NUM. | r | d | nd | vd | Effective radius |
|---|---|---|---|---|---|
| OBJ | INFINITY | 400.0000 | | | |
| 1SPS | −2.7951 | 0.0500 | 1.51621 | 56.22 | 0.2386 |
| STO | INFINITY | 0.4000 | 1.52000 | 61.99 | 0.2182 |
| 3 | INFINITY | 0.1300 | 1.51621 | 56.22 | 0.2497* |
| 4SPS | −0.5580 | 0.9872 | | | 0.2744 |
| 5 | INFINITY | 0.3500 | 1.47140 | 66.01 | 0.6229 |
| 6 | INFINITY | 0.0500 | | | 0.7059 |
| IMG | INFINITY | | | | |

ASPHERICAL SURFACE

1  K = −2.56220e+001, A3 = 8.23100e−001, A4 = −2.51010e+000,
   A5 = 0.00000e+000, A6 = −3.98700e+002, A7 = 0.00000e+000,
   A8 = 2.80340e+004, A9 = 0.00000e+000, A10 = −8.04170e+005,
   A11 = 0.00000e+000 A12 = 1.02280e+007, A13 = 0.00000e+000,
   A14 = −4.75320e+007, A15 = 0.00000e+000, A16 = 0.00000e+000
   A17 = 0.00000e+000, A18 = 0.00000e+000, A19 = 0.00000e+000,
   A20 = 0.00000e+000
4  K = −2.21590e+001, A3 = −6.37800e−001, A4 = −9.58570e−001,
   A5 = 0.00000e+000, A6 = −2.59980e+002, A7 = 0.00000e+000,
   A8 = 9.06280e+003, A9 = 0.00000e+000, A10 = −1.20580e+005,
   A11 = 0.00000e+000 A12 = 2.42980e+005, A13 = 0.00000e+000,
   A14 = 8.14940e+006, A15 = 0.00000e+000, A16 = −5.26510e+007
   A17 = 0.00000e+000, A18 = 0.00000e+000, A19 = 0.00000e+000,
   A20 = 0.00000e+000

| FL | 1.2412 |
|---|---|
| Fno | 2.8800 |
| w | 32.90 |
| y max | 0.714 |
| TL | 1.967 |
| BF | 0.050 |

Example 4

The lens data of the example 4 is shown in Table 4. FIG. 12 is a sectional view of the imaging lens of the example 4. FIGS. 13*a*, 13*b*, and 13*c* are aberration drawings (spherical aberration (a), astigmatism (b), and distortion (c)) of the example 4. The imaging lens of the example 4 comprises, from the object side, a first lens L1 which is a plane concave lens concave toward the object side, a first aperture stop SH1 which specifies an F number, a second lens L2 which is a parallel plate element, a second aperture stop SH2, a third lens L3 which is a plane convex lens convex toward the image side, and a parallel plate element PT which consists of an optical low pass filter, an IR cut filter or a seal glass of a solid-state image sensing element. IM represents an image pick-up surface of the image sensor. Further, all the surfaces of the lens part which touch the air have aspherical shapes.

Example 4

TABLE 4

Reference Wave Length = 587.56 nm

SURF DATA

| NUM. | r | d | nd | vd | Effective radius |
|---|---|---|---|---|---|
| OBJ | INFINITY | 400.0000 | | | |
| 1SPS | −1.8831 | 0.0500 | 1.51621 | 56.22 | 0.2405 |
| STO | INFINITY | 0.3000 | 1.52000 | 61.99 | 0.2211 |
| 3 | INFINITY | 0.1290 | 1.51621 | 56.22 | 0.2400* |
| 4SPS | −0.5221 | 0.2789 | | | 0.2647 |
| 5 | INFINITY | 0.3500 | 1.47140 | 66.01 | 0.3811 |
| 6 | INFINITY | 0.7834 | | | 0.4587 |
| IMG | INFINITY | | | | |

ASPHERICAL SURFACE

1  K = 9.04363e+000, A3 = 1.09660e+000, A4 = −3.60941e+000,
A5 = 0.00000e+000, A6 = −5.11068e+002, A7 = 0.00000e+000,
A8 = 3.74052e+004, A9 = 0.00000e+000, A10 = −1.12039e+006,
A11 = 0.00000e+000 A12 = 1.51268e+007, A13 = 0.00000e+000,
A14 = −7.61929e+007, A15 = 0.00000e+000, A16 = 0.00000e+000
A17 = 0.00000e+000; A18 = 0.00000e+000, A19 = 0.00000e+000,
A20 = 0.00000e+000

4  K = −1.09621e+001, A3 = −1.90500e−001, A4 = 2.19031e+000,
A5 = 0.00000e+000, A6 = −7.92226e+002, A7 = 0.00000e+000,
A8 = 4.40247e+004, A9 = 0.00000e+000, A10 = −1.29914e+006,
A11 = 0.00000e+000 A12 = 2.11853e+007, A13 = 0.00000e+000,
A14 = −1.79518e+008, A15 = 0.00000e+000, A16 = 6.17183e+008
A17 = 0.00000e+000, A18 = 0.00000e+000, A19 = 0.00000e+000,
A20 = 0.00000e+000

| | |
|---|---|
| FL | 1.2499 |
| Fno | 2.8800 |
| w | 32.77 |
| y max | 0.714 |
| TL | 1.891 |
| BF | 0.783 |

Example 5

The lens data of the example 5 is shown in Table 5. FIG. 14 is a sectional view of the imaging lens of the example 5. FIGS. 15a, 15b, and 15c are aberration drawings (spherical aberration (a), astigmatism (b), and distortion (c)) of the example 5. The imaging lens of the example 5 comprises, from the object side, a first lens L1 which is a plane concave lens concave toward the object side, a second lens L2 which is a parallel plate element, a first aperture stop SH1 which specifies an F number, a third lens L3 which is a plane convex lens convex toward the image side, and a parallel plate element PT which consists of an optical low pass filter, an IR cut filter or a seal glass of a solid-state image sensing element. IM represents an image pick-up surface of the image sensor. Further, all the surfaces of the lens part which touch the air have aspherical shapes.

Example 5

TABLE 5

Reference Wave Length = 587.56 nm

SURF DATA

| NUM. | r | d | nd | vd | Effective radius |
|---|---|---|---|---|---|
| OBJ | INFINITY | 400.0000 | | | |
| 1SPS | −5.7280 | 0.0500 | 1.51621 | 56.22 | 0.2168 |
| STO | INFINITY | 0.3000 | 1.52000 | 61.99 | 0.1989 |

TABLE 5-continued

| 3 | INFINITY | 0.1623 | 1.51621 | 56.22 | 0.2700* |
|---|---|---|---|---|---|
| 4SPS | −0.5458 | 0.3062 | | | 0.3203 |
| 5 | INFINITY | 0.3500 | 1.47140 | 66.01 | 0.3411 |
| 6 | INFINITY | 0.8145 | | | 0.4538 |
| IMG | INFINITY | | | | |

ASPHERICAL SURFACE

1  K = 3.00000e+001, A3 = −3.50633e+000, A4 = 7.99560e+001,
A5 = −8.52003e+002, A6 = 3.53656e+003, A7 = 0.00000e+000,
A8 = −2.30188e+004, A9 = 0.00000e+000, A10 = −2.84370e+005,
A11 = 0.00000e+000 A12 = 1.06061e+007, A13 = 0.00000e+000,
A14 = −8.76927e+007, A15 = 0.00000e+000, A16 = 3.68528e+007
A17 = 0.00000e+000, A18 = 0.00000e+000, A19 = 0.00000e+000,
A20 = 0.00000e+000

4  K = −2.01118e+001, A3 = −3.30693e−001, A4 = 4.04909e+000,
A5 = −1.47009e+002, A6 = 6.30980e+002, A7 = 0.00000e+000,
A8 = −2.07717e+003, A9 = 0.00000e+000, A10 = −4.57892e+004,
A11 = 0.00000e+000 A12 = 8.12886e+005, A13 = 0.00000e+000,
A14 = −4.08553e+006, A15 = 0.00000e+000, A16 = −7.63547e+006
A17 = 0.00000e+000, A18 = 1.21349e+008, A19 = 0.00000e+000,
A20 = −2.45151e+008

| | |
|---|---|
| FL | 1.1306 |
| Fno | 2.8800 |
| w | 31.31 |
| y max | 0.714 |
| TL | 1.983 |
| BF | 0.814 |

Example 6

The lens data of the example 6 is shown in Table 6. FIG. 16 is a sectional view of the imaging lens of the example 6. FIGS. 17a, 17b, and 17c are aberration drawings (spherical aberration (a), astigmatism (b), and distortion (c)) of the example 6. The imaging lens of the example 6 comprises, from the object side, a first lens L1 which is a plane concave lens concave toward the object side, a second aperture stop SH2 formed on an object side surface of a second lens L2, the second lens L2 which is a parallel plate element, a first aperture stop SH1 which specifies an F number formed on an image side surface of the second lens L2, a third lens L3 which is a plane convex lens convex toward the image side, and a parallel plate element PT which consists of an optical low pass filter, an IR cut filter or a seal glass of a solid-state image sensing element. IM represents an image pick-up surface of the image sensor. Further, all the surfaces of the lens part which touch the air have aspherical shapes.

Example 6

TABLE 6

Reference Wave Length = 587.56 nm

SURF DATA

| NUM. | r | d | nd | vd | Effective radius |
|---|---|---|---|---|---|
| OBJ | INFINITY | 400.0000 | | | |
| 1SPS | −2.1109 | 0.0510 | 1.51721 | 55.69 | 0.2684 |
| 2 | INFINITY | 0.3000 | 1.52000 | 61.99 | 0.2450* |
| STO | INFINITY | 0.1847 | 1.51721 | 55.69 | 0.2375 |
| 4SPS | −0.5394 | 0.2000 | | | 0.2885 |
| 5 | INFINITY | 0.3500 | 1.47140 | 66.01 | 0.4053 |
| 6 | INFINITY | 0.9498 | | | 0.5015 |
| IMG | INFINITY | | | | |

TABLE 6-continued

Reference Wave Length = 587.56 nm

ASPHERICAL SURFACE

1  K = 5.67178e+000, A3 = 8.20153e−001, A4 = −4.61184e+000,
   A5 = 0.00000e+000, A6 = −1.60183e+002, A7 = 0.00000e+000,
   A8 = 1.44044e+004, A9 = 0.00000e+000, A10 = −4.24549e+005,
   A11 = 0.00000e+000 A12 = 5.33108e+006, A13 = 0.00000e+000,
   A14 = −2.43350e+007, A15 = 0.00000e+000, A16 = 3.05862e+005
   A17 = 0.00000e+000, A18 = 0.00000e+000, A19 = 0.00000e+000,
   A20 = 0.00000e+000
4  K = −1.21270e+000, A3 = 1.06660e+000, A4 = −4.50784e+000,
   A5 = 0.00000e+000, A6 = −6.06774e+001, A7 = 0.00000e+000,
   A8 = 3.49701e+003, A9 = 0.00000e+000, A10 = −5.88922e+004,
   A11 = 0.00000e+000 A12 = 2.81734e+005, A13 = 0.00000e+000,
   A14 = 1.84934e+006, A15 = 0.00000e+000, A16 = −1.58255e+007
   A17 = 0.00000e+000, A18 = 0.00000e+000, A19 = 0.00000e+000,
   A20 = 0.00000e+000

| | |
|---|---|
| FL | 1.2553 |
| Fno | 2.8800 |
| w | 38.64 |
| y max | 0.893 |
| TL | 2.036 |
| BF | 0.950 |

Example 7

The lens data of the example 7 is shown in Table 7. FIG. 18 is a sectional view of the imaging lens of the example 7. FIGS. 19*a*, 19*b*, and 19*c* are aberration drawings (spherical aberration (a), astigmatism (b), and distortion (c)) of the example 7. The imaging lens of the example 7 comprises, from the object side, a first lens L1 which is a plane concave lens concave toward the object side, a first aperture stop SH1 which specifies an F number formed on an object side surface of a second lens L2, the second lens L2 which is a parallel plate element, a second aperture stop SH2 formed on an image side surface of the second lens L2, a third lens L3 which is a plane convex lens convex toward the image side, and a parallel plate element PT which consists of an optical low pass filter, an IR cut filter or a seal glass of a solid-state image sensing element. IM represents an image pick-up surface of the image sensor. Further, all the surfaces of the lens part which touch the air have aspherical shapes.

Example 7

TABLE 7

Reference Wave Length = 587.56 nm

SURF DATA

| NUM. | r | d | nd | vd | Effective radius |
|---|---|---|---|---|---|
| OBJ | INFINITY | 400.0000 | | | |
| 1SPS | −11.4412 | 0.0634 | 1.51621 | 56.22 | 0.1996 |
| STO | INFINITY | 0.3500 | 1.52000 | 61.99 | 0.1702 |
| 3 | INFINITY | 0.1417 | 1.51621 | 56.22 | 0.2418* |
| 4SPS | −0.4903 | 0.3805 | | | 0.2734 |
| 5 | INFINITY | 0.3271 | 1.47140 | 66.01 | 0.4713 |
| 6 | INFINITY | 0.3687 | | | 0.5633 |
| IMG | INFINITY | | | | |

ASPHERICAL SURFACE

1  K = −3.00000e+001, A3 = 1.15261e+000, A4 = −7.45796e+000,
   A5 = 0.00000e+000, A6 = −6.97572e+002, A7 = 0.00000e+000,
   A8 = 9.97726e+004, A9 = 0.00000e+000, A10 = −4.85252e+006,
   A11 = 0.00000e+000 A12 = 1.02302e+008, A13 = 0.00000e+000,

TABLE 7-continued

Reference Wave Length = 587.56 nm

A14 = −7.93218e+008, A15 = 0.00000e+000, A16 = 0.00000e+000
   A17 = 0.00000e+000, A18 = 0.00000e+000, A19 = 0.00000e+000,
   A20 = 0.00000e+000
4  K = −7.70486e−001, A3 = 2.80371e−001, A4 = 5.54469e+000,
   A5 = 0.00000e+000, A6 = −4.87421e+002, A7 = 0.00000e+000,
   A8 = 1.65057e+004, A9 = 0.00000e+000, A10 = −2.75049e+005,
   A11 = 0.00000e+000 A12 = 2.07738e+006, A13 = 0.00000e+000,
   A14 = −3.67080e+006, A15 = 0.00000e+000, A16 = −1.89275e+007
   A17 = 0.00000e+000, A18 = 0.00000e+000, A19 = 0.00000e+000,
   A20 = 0.00000e+000

| | |
|---|---|
| FL | 0.9755 |
| Fno | 2.8800 |
| w | 40.49 |
| y max | 0.7113 |
| TL | 1.631 |
| BF | 0.3687 |

Example 8

The lens data of the example 8 is shown in Table 8. FIG. 20 is a sectional view of the imaging lens of the example 8. FIGS. 21*a*, 21*b*, and 21*c* are aberration drawings (spherical aberration (a), astigmatism (b), and distortion aberration (c)) of the example 8. The imaging lens of the example 8 comprises, from the object side, a first aperture stop SH1 which specifies an F number, a first lens L1 which is a plane concave lens concave toward the object side, a second lens L2 which is a parallel plate element, a second aperture stop SH2 formed on an image side surface of the second lens L2, a third lens L3 which is a plane convex lens convex toward the image side, and a parallel plate element PT which consists of an optical low pass filter, an IR cut filter or a seal glass of a solid-state image sensing element. IM represents an image pick-up surface of the image sensor. Further, all the surfaces of the lens part which touch the air have aspherical shapes.

Example 8

TABLE 8

Reference Wave Length = 587.56 nm

SURF DATA

| NUM. | r | d | nd | vd | Effective radius |
|---|---|---|---|---|---|
| OBJ | INFINITY | 400.0000 | | | |
| STO | INFINITY | 0.0000 | | | 0.2075 |
| 2SPS | −4.7326 | 0.0500 | 1.51621 | 56.22 | 0.2101 |
| 3 | INFINITY | 0.4000 | 1.52000 | 61.99 | 0.2137 |
| 4 | INFINITY | 0.1279 | 1.51621 | 56.22 | 0.2700* |
| 5SPS | −0.5676 | 0.8618 | | | 0.2915 |
| 6 | INFINITY | 0.3500 | 1.47140 | 66.01 | 0.6007 |
| 7 | INFINITY | 0.1003 | | | 0.6771 |
| IMG | INFINITY | | | | |

ASPHERICAL SURFACE

2  K = −3.00000e+001, A3 = 8.23100e−001, A4 = −3.89739e+000,
   A5 = 0.00000e+000, A6 = −1.79616e+002, A7 = 0.00000e+000,
   A8 = 1.97326e+004, A9 = 0.00000e+000, A10 = −6.89052e+005,
   A11 = 0.00000e+000 A12 = 9.45671e+006, A13 = 0.00000e+000,
   A14 = −4.06084e+007, A15 = 0.00000e+000, A16 = 0.00000e+000
   A17 = 0.00000e+000, A18 = 0.00000e+000, A19 = 0.00000e+000,
   A20 = 0.00000e+000
5  K = −2.11093e+001, A3 = −6.37800e−001, A4 = 4.31032e−001,
   A5 = 0.00000e+000, A6 = −3.33364e+002, A7 = 0.00000e+000,
   A8 = 1.16836e+004, A9 = 0.00000e+000, A10 = −1.62564e+005,

TABLE 8-continued

Reference Wave Length = 587.56 nm

A11 = 0.00000e+000, A12 = 5.33447e+005, A13 = 0.00000e+000,
A14 = 7.09014e+006, A15 = 0.00000e+000, A16 = −4.81212e+007
A17 = 0.00000e+000, A18 = 0.00000e+000, A19 = 0.00000e+000,
A20 = 0.00000e+000

| | |
|---|---|
| FL | 1.1930 |
| Fno | 2.8800 |
| w | 33.78 |
| y max | 0.714 |
| TL | 1.890 |
| BF | 0.100 |

The values of the example corresponding to each conditional expression about the first embodiment are shown in Table 9.

TABLE 9

| | Example 1 | Example 2 | Example 3 | Example 4 | Example 5 | Example 6 |
|---|---|---|---|---|---|---|
| (1) rL11/f | −3.48 | −4.69 | −2.51 | −1.66 | −3.30 | −1.83 |
| (2) ν1 | 48.80 | 56.23 | 56.23 | 56.23 | 56.23 | 55.70 |
| (3) N3 | 1.54 | 1.52 | 1.52 | 1.52 | 1.52 | 1.52 |
| (5) rL23/rL11 | 0.15 | 0.10 | 0.18 | 0.25 | 0.15 | 0.15 |
| (9) dc/f | 0.32 | 0.29 | 0.28 | 0.28 | 0.31 | 0.28 |
| (10) (D1 + D3)/D2 | 0.71 | 0.44 | 0.45 | 0.60 | 0.71 | 0.79 |
| (11) Fno | 2.88 | 2.88 | 2.88 | 2.88 | 2.88 | 2.88 |
| (12) P | 1.75 | 1.75 | 1.75 | 1.75 | 1.75 | 2.20 |
| (13) TTL | 1.90 | 1.89 | 1.97 | 1.89 | 1.98 | 2.04 |

In cases when compared with known examples, the scale is adjusted so mat me maximum image heights become the same values. Further, by making each wavelength of c line, d line, and f line (656.2725 nm, 587.5618 nm, and 486.1327 nm) into the same weight, each aberration is evaluated at 80 percent image height. Further, at this tome, the sagittal peak position at the 80-percent image height when taking a peak in ¼ Nyquist frequency on the axis as the best is made into the amount of distortion, the difference of the sagittal peak position at 80-percent image height and a meridional peak position in ¼ Nyquist frequency is made into astigmatic amount, the difference of the image focus position of marginal light my and the image focus position of the primary light ray at 80-percent image height is made into an amount of coma aberration, and the quotient of the difference between the image focus position of c line and f line at 80-percent image height divided by the number of image pixels is made into a magnification chromatic aberration.

The value of the example corresponding to each conditional expression about the second embodiment is shown in Table 10.

TABLE 10

| | Example 3 | Example 4 | Example 6 | Example 7 | Example 8 |
|---|---|---|---|---|---|
| (7) rL11/f | −2.51 | −1.66 | −1.83 | −21.70 | −4.69 |
| (8) rL23/rL11 | 0.18 | 0.25 | 0.24 | 0.02 | 0.10 |
| (9) dc/f | 0.28 | 0.28 | 0.28 | 0.36 | 0.29 |
| (10) (D1 + D3)/D2 | 0.45 | 0.60 | 0.79 | 0.59 | 0.44 |

In cases when compared with known examples, the scale is adjusted so that the maximum image heights become the same values. Further, by making each wavelength of c line, d line, and f line (656.2725 nm, 587.5618 nm, 486.1327 nm) into the same weight, each aberrations are evaluated at 80 percent image height. Further, at this tome, the sagittal peak position at the 80-percent image height when taking a peak in ¼ Nyquist frequency on the axis is made into the amount of distortion, the difference of the sagittal peak position at 80-percent image height and a meridional peak position in ¼ Nyquist frequency is made into astigmatic quantity, the difference of the image focus position of marginal light my and the image focus position of the primary light ray at 80-percent image height is made into the amount of coma aberrations, and the quotient the difference of the image focus position of c line at 80-percent image height and f line by the number divided by the number of image pixels is made into a magnification chromatic aberration.

As for the example 1, compared to the known examples, astigmatism and a magnification chromatic aberration are properly rectified and especially the coma aberration is properly rectified.

As for the example 2, compared to the known examples, the coma aberration and the magnification chromatic aberration are properly rectified, and especially astigmatism is more properly rectified.

As for the example 3, compared to the known examples, the distortion, astigmatism, coma aberrations, and the magnification chromatic aberrations are all properly rectified.

As for the example 4, compared to the known examples, the distortion, astigmatism, coma aberrations, and the magnification chromatic aberrations are all properly rectified good.

As for the example 5, compared to the known examples, the distortion, astigmatism, and the magnification chromatic aberration are properly rectified and especially the coma aberration is properly rectified.

As for the example 6, compared to the known examples, the distortion, astigmatism, coma aberrations, and the magnification chromatic aberrations are all properly rectified.

As for the example 7, compared to the known examples, the viewing angle is wider and the coma aberration and the magnification chromatic aberration are more properly rectified.

As for the example 8, compared to the known examples, the astigmatism, the coma aberration, and the magnification chromatic aberration are properly rectified.

Therefore, according to the imaging lenses compared to the known examples, it is shown that the imaging lenses of which the coma aberrations are properly rectified and which are compatible with wide viewing angle can be offered.

Further, in examples 3 and 4, it is shown that the imaging lens of which distortion and astigmatism also are properly rectified and which obtains still higher optical performance can be offered.

INDUSTRIAL APPLICABILITY

According to the present invention, the optimal imaging lens suitable for mass productivity and for miniaturization can be offered. The portable information terminal mentioned here is not limited to a cellular phone.

DESCRIPTION OF NUMERIC DESIGNATIONS

11 Lens Frame
12 Printed Wiring Board
71 Upper Case
72 Lower Case
73 Hinge
B Manual operation button
C Imaging element
CL Joint type compound lens D1 and D2 Display screen
GP Parallel plate
L1 First lens
L2 Second lens
L3 Third lens
L3a Leg
LB Lens block
M1 Molding die
M2 Molding die
PT Parallel plate element,
SH1 First aperture stop
SH2 Second aperture stop
SM1 Gobo
SM2 Gobo
T Cellular phone

The invention claimed is:

1. An imaging lens comprising a single joint type compound lens for forming a subject image to a photoelectric conversion section of a solid-state image sensing element, the joint type compound lens configured to include, in an order from an object side thereof:
a first lens having a plane concave lens concave toward the object side;
a second lens which is a parallel plate element; and
a third lens having a plane convex lens convex toward an image side, wherein the first lens and the third lens are formed of energy curable resin material; the parallel plate element is formed of glass material; the first lens and the second lens are directly or indirectly joint; and the second lens and the third lens are directly or indirectly joint,
wherein the following conditional expression is satisfied $$-1.5 < rL11/f < -5.0 \quad (1)$$

where, f is a focal length of a whole system of the imaging lens and rL11 is a local curvature radius of an object side surface of the first lens calculated by the following formula:

$$rL11 = \{(h1)2 + (s1)2\}/(2s1)$$

where h1 is 1/10 of an effective radius at an object side surface of the first lens, and s1 is an amount of a displacement in a parallel direction of an optical axis from a surface apex at a height h1 of the object side surface of the first lens.

2. The imaging lens described in claim 1, wherein the following conditional expression is satisfied:

$$30 \leq v1 \leq 59 \quad (2)$$

$$1.50 \leq N3 \leq 1.65 \quad (3)$$

where, v1 is an Abbe number of the material of the first lens, and N3 is a refractive index of the material of the third lens.

3. The imaging lens described in claim 1, wherein a first aperture stop is arranged at the object side of an image side surface of the third lens, and a second aperture stop which has a larger aperture diameter than the first aperture stop and satisfies the following conditional expression is arranged in addition to the first aperture stop:

$$Ra < Ha \quad (4)$$

where, Ra is a radius of the second aperture stop, and Ha is a distance from the optical axis to a point where a light ray of a most periphery side at a maximum image height passes through a surface on which the second aperture stop is formed.

4. The imaging lens described in claim 1, wherein the first aperture stop is arranged on an object side surface of the second lens.

5. The imaging lens described in claim 1, wherein the first aperture stop is arranged on an image side surface of the second lens.

6. The imaging lens described in claim 1, wherein the following conditional expression is satisfied:

$$0.09 < rL32/rL11 < 0.29 \quad (5)$$

where rL32 is a local curvature radius given by the following formula of an image side surface of the third lens:

$$rL32 = \{(h3)2 + (s3)2\}/(2s3)$$

where h3 is 1/10 of an effective radius of the image side surface of the third lens and s3 is a distance between a leg of a perpendicular line drawn to the optical axis from a surface apex at a height h3 of the image side surface of the third lens and an apex of the image side surface.

7. The imaging lens described in claim 1, wherein the following conditional expression is satisfied:

$$0.25 < dc/f < 0.50 \quad (9)$$

where dc is a thickness of the parallel plate element, (in a case when there are two or more parallel plate elements, the thickness represents a total thickness).

8. The imaging lens described in claim 1, wherein the following conditional expression is satisfied:

$$0 < (D1+D3)/D2 < 1 \quad (10)$$

where D1 is a thickness of the first lens on the optical axis in the direction of the optical axis, D2 is a thickness of the second lens on a paraxial in the direction of the optical axis, and D3 is a thickness of the third lens on a paraxial in the direction of the optical axis.

9. The imaging lens described in claim 1, wherein at least one of an object side surface of the first lens and an image side surface of the third lens includes an aspheric surface.

10. The imaging lens described in claim 1, wherein at least one of an object side surface of the first lens and an image side surface of the third lens employs an odd order aspheric surface to which an odd term is added.

11. The imaging lens described in claim 1, wherein, after fabricating plural sets of the first lens and the third lens on a glass parallel plate material, a plurality of joint type compound lens is manufactured by cutting the glass parallel plate material into each set.

12. An imaging device comprising an imaging element of which sensor size is equal to and less than 1/10 inch sizes (pixel pitch of 2.2 micrometers) and the imaging lens described in claim 1.

13. An imaging lens comprising: a first aperture stop for forming a subject image to a photoelectric conversion section of a solid-state image sensing element; a second aperture stop having an aperture larger than that of the first aperture stop; and a single joint type compound lens, wherein the joint type compound lens is configured to include, from an object side, a first lens having a plane concave lens concave toward the object side, a second lens which is a parallel plate element, and a third lens having a plane convex lens convex toward an image side; the first aperture is arranged at the object side of an image side surface of the third lens, the second aperture is arranged on an object side surface or an image side surface of the second lens; the first lens and the third lens are formed of energy curable resin material; the parallel plate element is formed of glass material; the first lens and the second lens are configured to be mutually joint directly or indirectly and the second lens and the third lens are configured to be mutually joint directly or indirectly; and the following conditional expression is satisfied:

$$-1.5 < rL11/f < -5.0 \qquad (1)$$

$$Ra < Ha \qquad (6)$$

where, f is a focal length of a whole system of the imaging lens and rL11 is a local curvature radius of an object side surface of the first lens calculated by the following formula:

$$rL11 = \{(h1)2 + (s1)2\}/(2s1)$$

where h1 is 1/10 of an effective radius in an object side surface of the first lens, and s1 is an amount of a displacement in a parallel direction of an optical axis from a surface apex at a height h1 of the object side surface of the first lens, and Ra is a radius of the second aperture stop and Ha is a distance from an optical axis to a point where a light ray of a most periphery side at a maximum image height passes through the surface on which the second aperture stop is formed.

14. An imaging lens comprising: a first aperture stop for forming a subject image to a photoelectric conversion section of a solid-state image sensing element; a second aperture stop having an aperture larger than that of the first aperture stop; and a single joint type compound lens, wherein the joint type compound lens is configured to include, from an object side, a first lens having a plane concave lens concave toward the object side, a second lens which is a parallel plate element, and a third lens having a plane convex lens convex toward an image side; the first aperture is arranged at the object side of an image side surface of the third lens, the second aperture is arranged on an object side surface or an image side surface of the second lens; the first lens and the third lens are formed of energy curable resin material; the parallel plate element is formed of glass material; the first lens and the second lens are configured to be mutually joint and the second lens and the third lens are configured to be mutually joint; and the following conditional expression is satisfied:

$$Ra < Ha \qquad (6)$$

where Ra is a radius of the second aperture stop and Ha is a distance from an optical axis to a point where a light ray of a most periphery side at a maximum image height passes through the surface on which the second aperture stop is formed.

15. The imaging lens described in claim 14, wherein the following conditional expression is satisfied:

$$-1.5 < rL11/f < -22.0 \qquad (7)$$

where f is a focal length of a whole system of the imaging lens, and rL11 is a local curvature radius given by the following formula of an image side surface of the first lens:

$$rL11 = \{(h1)2 + (s1)2\}/(2s1)$$

where, h1 is 1/10 of an effective radius in an object side surface of the first lens, and s1 is an amount of displacement in a parallel direction to the optical axis from a surface apex at a height h1 of the object side surface of the first lens.

16. The imaging lens described in claim 14, wherein the first aperture stop is formed on an object side surface of the second lens, and the second aperture stop is formed on an image side surface of the second lens.

17. The imaging lens described in claim 14, wherein the first aperture stop is formed on an image side surface of the second lens, and the second aperture stop is formed on an object side surface of the second lens.

18. The imaging lens described in claim 14, wherein the following conditional expression is satisfied:

$$0.01 < rL32/rL11 < 0.30 \qquad (8)$$

where rL32 is a local curvature radius of an image side surface of the third lens calculated by the following equation:

$$rL32 = \{(h3)2 + (s3)2\}/(2s3)$$

where h3 is 1/10 of an effective radius in the image side surface of the third lens, and s3 is a distance between a leg of a perpendicular line drawn to the optical axis from a surface apex at a height h3 of the image side surface of the third lens and an apex of the image side surface.

* * * * *